(12) United States Patent
Roth et al.

(10) Patent No.: US 8,885,240 B2
(45) Date of Patent: Nov. 11, 2014

(54) REARVIEW ASSEMBLY FOR A VEHICLE

(75) Inventors: Mark R. Roth, Coloma, MI (US); Mark D. Bugno, Stevensville, MI (US); Danny L. Minikey, Jr., Fenwick, MI (US); David J. Cammenga, Zeeland, MI (US); William L. Tonar, Holland, MI (US); Joel A. Stray, Hudsonville, MI (US); Danny L. Suman, Holland, MI (US); Sandra Lynn Suman, legal representative, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 276 days.

(21) Appl. No.: 13/567,363

(22) Filed: Aug. 6, 2012

(65) Prior Publication Data

US 2013/0194650 A1 Aug. 1, 2013

Related U.S. Application Data

(60) Provisional application No. 61/515,190, filed on Aug. 4, 2011.

(51) Int. Cl.
*G02F 1/153* (2006.01)
*B60R 1/12* (2006.01)
*B60R 1/02* (2006.01)

(52) U.S. Cl.
CPC ........... *B60R 1/02* (2013.01); *B60R 2001/1215* (2013.01); *B60R 1/12* (2013.01); *G02F 1/153* (2013.01)
USPC .......................................... 359/267; 359/872

(58) Field of Classification Search
CPC ................. G02F 1/153; B60R 1/12
USPC ........................................ 359/267, 630, 827
See application file for complete search history.

(56) References Cited

U.S. PATENT DOCUMENTS

| | | |
|---|---|---|
| 3,171,886 A | 3/1965 | Holt et al. |
| 3,382,354 A | 5/1968 | Hedgewick et al. |
| 4,308,316 A | 12/1981 | Gordon |
| 4,377,613 A | 3/1983 | Gordon |
| 4,419,386 A | 12/1983 | Gordon |
| 4,440,822 A | 4/1984 | Gordon |
| 5,066,112 A | 11/1991 | Lynam et al. |
| 5,198,929 A | 3/1993 | Clough |
| 5,510,813 A | 4/1996 | Makinwa et al. |
| 5,679,283 A | 10/1997 | Tonar et al. |
| 5,790,298 A | 8/1998 | Tonar |
| 5,888,431 A | 3/1999 | Tonar et al. |
| 5,928,572 A | 7/1999 | Tonar et al. |
| 5,940,201 A | 8/1999 | Ash et al. |
| 6,102,546 A | 8/2000 | Carter |
| 6,193,378 B1 | 2/2001 | Tonar et al. |

(Continued)

FOREIGN PATENT DOCUMENTS

EP 0047808 A1 9/1980
WO 2011044312 A1 4/2011

*Primary Examiner* — Joseph P Martinez
(74) *Attorney, Agent, or Firm* — Price Heneveld LLP; Scott P. Ryan

(57) ABSTRACT

A rearview assembly for a vehicle includes a housing. A carrier is operably connected with the housing and supports a display. A circuit board is disposed in the housing. A sensing system is disposed proximate the display and is connected with the circuit board. A switching assembly is operably connected with the circuit board. Actuation of the switching assembly when the sensing system has been activated enables a function of the rearview assembly.

20 Claims, 18 Drawing Sheets

(56) References Cited

U.S. PATENT DOCUMENTS

| | | |
|---|---|---|
| 6,243,080 B1 | 6/2001 | Molne |
| 6,447,123 B2 | 9/2002 | Tonar et al. |
| 6,492,979 B1 | 12/2002 | Kent et al. |
| 6,499,850 B2 | 12/2002 | Waldmann |
| 6,545,794 B2 | 4/2003 | Ash et al. |
| 6,572,233 B1 | 6/2003 | Northman et al. |
| 6,578,972 B1 | 6/2003 | Heirich et al. |
| 6,614,579 B2 | 9/2003 | Roberts et al. |
| 6,635,194 B2 | 10/2003 | Kloeppner et al. |
| D493,394 S | 7/2004 | Lawlor et al. |
| 6,816,297 B1 | 11/2004 | Tonar et al. |
| 6,888,322 B2 | 5/2005 | Dowling et al. |
| 7,064,882 B2 | 6/2006 | Tonar et al. |
| 7,324,261 B2 | 1/2008 | Tonar et al. |
| 7,348,967 B2 | 3/2008 | Zadesky et al. |
| 7,349,143 B2 | 3/2008 | Tonar et al. |
| 7,372,611 B2 | 5/2008 | Tonar et al. |
| 7,379,225 B2 | 5/2008 | Tonar et al. |
| 7,391,563 B2 | 6/2008 | McCabe et al. |
| 7,477,439 B2 | 1/2009 | Tonar et al. |
| 7,499,040 B2 | 3/2009 | Zadesky et al. |
| 7,510,287 B2 | 3/2009 | Hook |
| 7,510,311 B2 | 3/2009 | Romas et al. |
| 7,511,872 B2 | 3/2009 | Tonar et al. |
| 7,570,413 B2 | 8/2009 | Tonar et al. |
| 7,602,542 B2 | 10/2009 | Tonar et al. |
| 7,612,929 B2 | 11/2009 | Tonar et al. |
| 7,633,747 B2 | 12/2009 | Yang et al. |
| 7,683,768 B2 | 3/2010 | Lindahl et al. |
| 7,690,824 B2 | 4/2010 | Uken et al. |
| 7,719,750 B2 | 5/2010 | Tonar et al. |
| 7,772,507 B2 | 8/2010 | Orr et al. |
| 7,804,448 B2 | 9/2010 | Bull et al. |
| 7,817,020 B2 | 10/2010 | Turnbull et al. |
| 7,859,738 B2 | 12/2010 | Baur et al. |
| 7,914,172 B2 | 3/2011 | Nagara et al. |
| 7,978,393 B2 | 7/2011 | Tonar et al. |
| 7,990,079 B2 | 8/2011 | Hargenrader et al. |
| 8,004,741 B2 | 8/2011 | Tonar et al. |
| 8,049,640 B2 | 11/2011 | Uken et al. |
| 8,169,684 B2 | 5/2012 | Bugno |
| 2001/0055214 A1 | 12/2001 | Chang |
| 2002/0024713 A1* | 2/2002 | Roberts et al. ............ 359/267 |
| 2005/0281043 A1 | 12/2005 | Eisenbraun |
| 2007/0201122 A1 | 8/2007 | Dozeman et al. |
| 2008/0310005 A1 | 12/2008 | Tonar et al. |
| 2009/0303566 A1 | 12/2009 | Tonar et al. |
| 2010/0020380 A1 | 1/2010 | Tonar et al. |
| 2010/0032017 A1 | 2/2010 | Bae |
| 2010/0066519 A1 | 3/2010 | Baur et al. |
| 2010/0067253 A1 | 3/2010 | Fehn et al. |
| 2010/0246017 A1 | 9/2010 | Tonar et al. |
| 2010/0321758 A1 | 12/2010 | Bugno |
| 2011/0317242 A1 | 12/2011 | Tonar et al. |
| 2012/0229882 A1 | 9/2012 | Fish, Jr. et al. |
| 2012/0268961 A1 | 10/2012 | Cammenga et al. |

* cited by examiner

REARVIEW ASSEMBLY FOR A VEHICLE

CROSS-REFERENCE TO RELATED APPLICATION

This application claims priority to and the benefit under 35 U.S.C. §119(e) of U.S. Provisional Patent Application No. 61/515,190, filed on Aug. 4, 2011, entitled "REARVIEW ASSEMBLY FOR A VEHICLE," the entire disclosure of which is hereby incorporated herein by reference.

BACKGROUND OF THE INVENTION

The present invention generally relates to a rearview assembly for a vehicle, and more particularly to a glass operated mechanical switching construction used in conjunction with a sensing system.

SUMMARY OF THE INVENTION

One aspect of the present invention includes a rearview assembly for a vehicle having a housing and a carrier that is operably connected with the housing and supports a display. A circuit board is disposed in the housing. A sensing system is disposed proximate the display and is connected with the circuit board. A switching assembly is operably connected with the circuit board. Actuation of the switching assembly when the sensing system has been activated enables a predetermined function of the rearview assembly.

Another aspect of the present invention includes a rearview assembly for a vehicle having a housing and a carrier that is operably connected with the housing and supports a mirror element. A circuit board is disposed in the housing. A sensing system is disposed proximate the mirror element and is connected with the circuit board. The sensing system is operable between an activated condition and a deactivated condition. A switching assembly is operably connected with the circuit board. Actuation of the switching assembly when the sensing system has been activated enables a first function of the rearview assembly and actuation of the switching assembly when the sensing system has been deactivated enables a second function of the rearview assembly.

Yet another aspect of the present invention includes a rearview assembly for a vehicle having a housing. A carrier is operably connected with the housing. An electrically dimmable element is supported on the carrier and includes a first substrate and a second substrate. A circuit board is disposed proximate the housing. A sensing system includes a first sensing area and a second sensing area disposed proximate the first substrate of the electrochromic element and is operably connected with the circuit board. A switching assembly is operably connected with the circuit board. Actuation of the switching assembly when the first sensing area has been activated enables a first function of the rearview assembly and actuation of the switching assembly when the second sensing area has been activated enables a second function of the rearview assembly.

Yet another aspect of the present invention includes a rearview assembly for a vehicle having a housing. A carrier is operably connected with the housing. An electrochromic element is supported on the carrier and includes a first substrate and a second substrate. A circuit board is disposed in the housing. A switching assembly includes a first switch and a second switch that are disposed proximate a periphery of the first substrate and are operably connected with the circuit board. The first substrate of the electrochromic element is pivotal about multiple axes relative to the carrier. Pivotal rotation of the electrochromic element about a first axis actuates the first switch and pivotal rotation of the electrochromic element about a second axis actuates the second switch.

In still another aspect of the present invention includes a rearview assembly for a vehicle that includes both a sensing system for determining and confirming a selection location established by a conductive member, as well as a switching assembly adapted to enable a function associated with the selection location established by the conductive member. The rearview assembly provides audible and tactile confirmation of engagement and at the same time provides an aesthetically pleasing design.

In still another aspect of the present invention, one or more analog pressure sensing elements are used to determine the approximate location of a press, as well as the amount of pressure being applied by a user. Different activation thresholds may be applied to various functions.

These and other aspects, objects, and features of the present invention will be understood and appreciated by those skilled in the art upon studying the following specification, claims, and appended drawings.

DETAILED DESCRIPTION OF EMBODIMENTS

Figure 1:
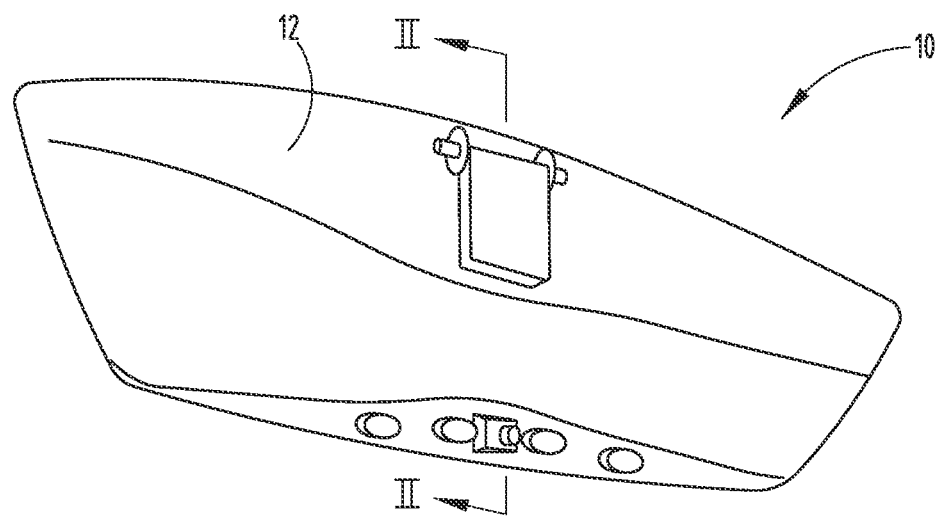
FIG. 1 is a front perspective view illustrating one embodiment of a rearview assembly of the present invention.
Figure 2:
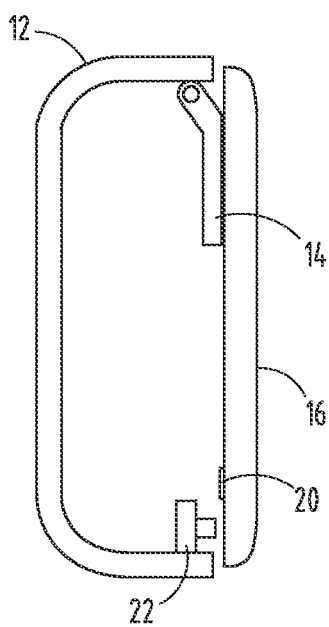
FIG. 2 is a side cross-sectional view taken at line II-II of FIG. 1.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Further, it will be understood that different embodiments having similar features may include like reference numerals.

Referring to FIGS. 1-10, reference numeral 10 generally designates a rearview assembly for a vehicle having a mounting member 12. A carrier 14 is operably connected with the mounting member 12 and supports a display 16. A circuit board 18 is disposed in the mounting member 12. A sensing system 20 is disposed proximate the display 16 and is connected with the circuit board 18. A switching assembly 22 is operably connected with the circuit board 18. Actuation of the switching assembly 22 when the sensing system 20 has been activated enables a predetermined function of the rearview assembly 10.

Generally, the rearview assembly 10 of the present invention has a sensing system 20 that can detect a selected function chosen by a user. In one embodiment, the switching assembly 22 incorporates a mechanical-type switch, such as a tac switch, that is used to detect that the display 16 has been displaced or moved by the user. The sensing system 20 includes sensing areas 21 used to determine the engagement location associated with the function selected by the user. In another embodiment, the sensing system 20 detects a selected function chosen by a user and also enables activation of that function based on the user engagement location. In this instance, the sensing system 20 includes a feedback device that produces audible, visual, and/or tactile confirmation that a function has been chosen by a user. Additionally, the sensing system 20 is used to identify the engagement location on the display 16. It will be understood that the engagement location is a position on the display 16 associated with a particular feature or function of the rearview assembly 10. The user establishes an engagement location by activating the sensing area 21. This can be done by the user physically contacting the sensor with a conductive member (finger) or by positioning the sensing area 21 such that the presence of the conductive member is registered by the sensor, which may not require physical contact.

Referring to the embodiment illustrated in FIGS. 3A-3E, the carrier 14 may be operably connected with the mounting member 12 via a mechanical hinge 40. It is contemplated that the mounting member 12 could be a housing, a second carrier, etc., that is operably coupled to the carrier 14. The mounting member 12 includes a top wall 42 and a bottom wall 44 separated by a rear wall 46. The rear wall 46 includes internal posts 48 designed to securely support the circuit board 18 thereon. The top wall 42 of the mounting member 12 includes a pin aperture 50 adapted to receive a hinge pin 52. The carrier 14 includes a plurality of supports 54 that are rotatably attached with the hinge pin 52 and adapted to rotate about a central axis 60 defined by the hinge pin 52. Accordingly, the carrier 14 rotates in the direction of arrow 62 relative to the mounting member 12. The bottom wall 44 includes a staggered forward end 66. First and second abutments 70, 72 are disposed on the carrier 14 adjacent the switching assembly 22 and prevent overtravel of the carrier 14. The first and second abutments 70, 72, together with the staggered forwarded end 66, define a slot gap 68 that allows a predetermined amount of rotation of the carrier 14 and display 16. The first and second abutments 70, 72 include a travel distance that is equal to or slightly less than the distance to actuate the switching assembly 22, as disclosed in further detail herein.

Figure 3A:
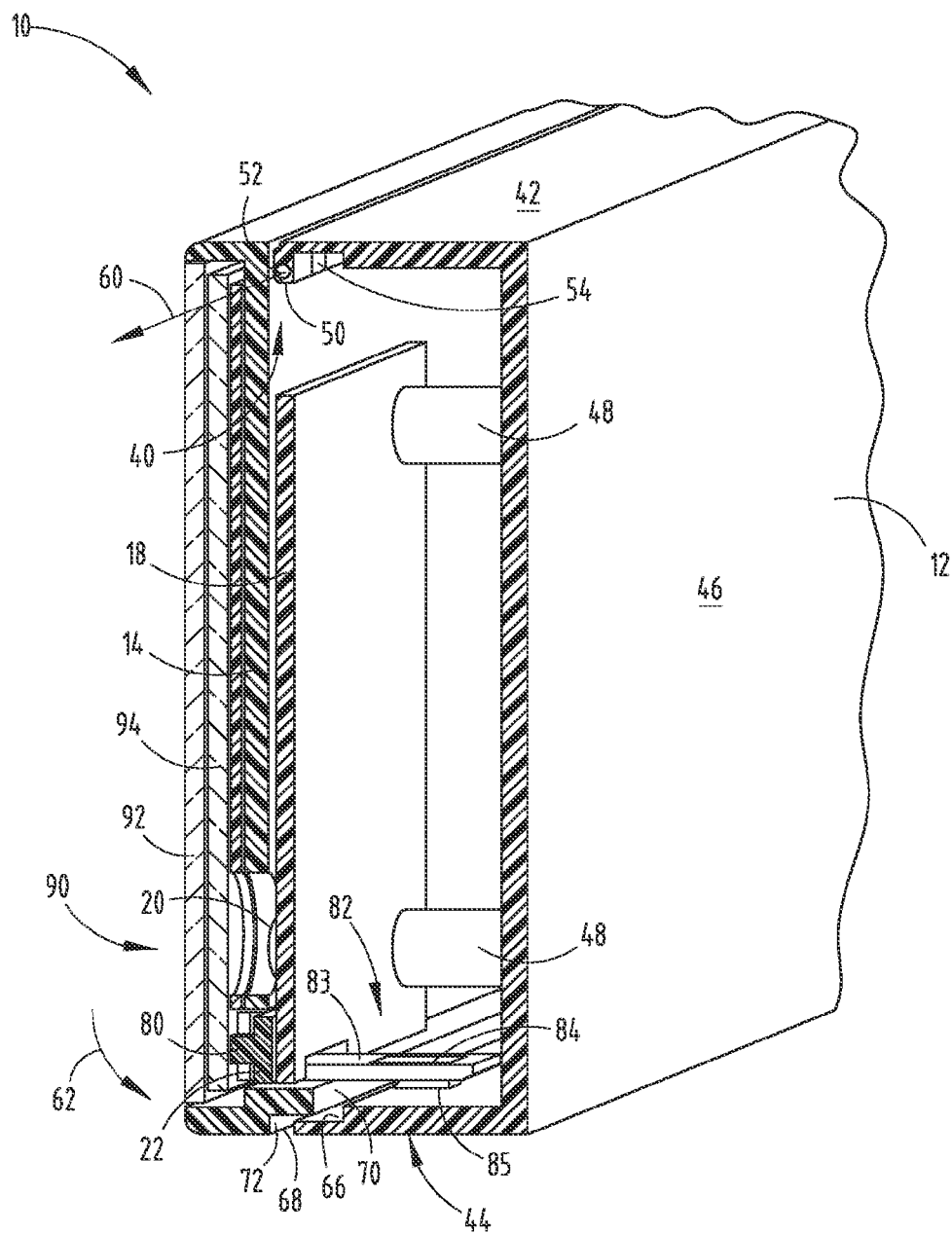
FIG. 3A is a top perspective cross-sectional view of one embodiment of a rearview assembly of the present invention.
Figure 3B:
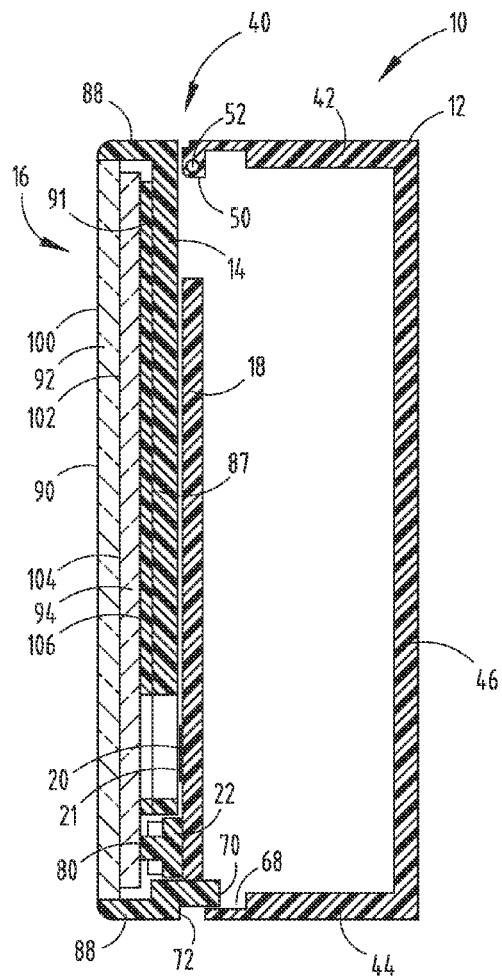
FIG. 3B is a first elevational cross-sectional view of the rearview assembly of FIG. 3A.
Figure 3C:
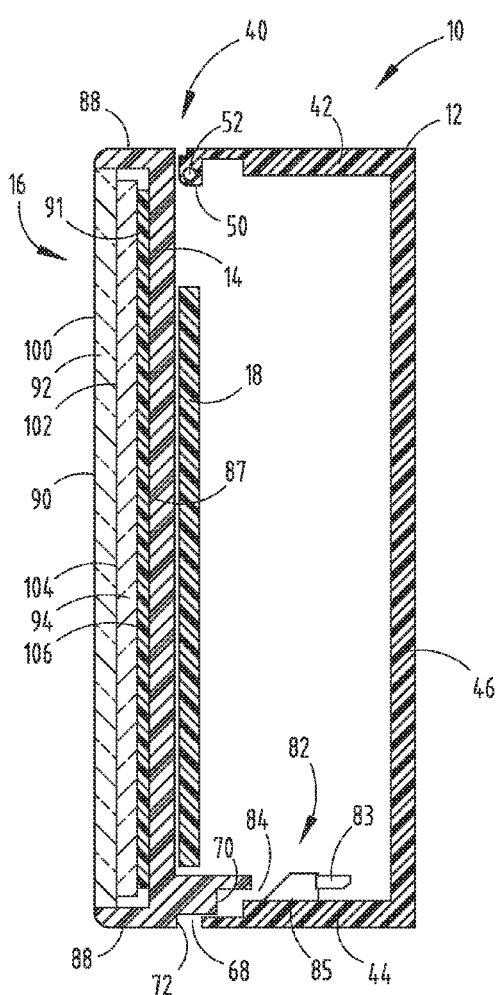
FIG. 3C is a second elevational cross-sectional view of the rearview assembly of FIG. 3A.
Figure 3D:
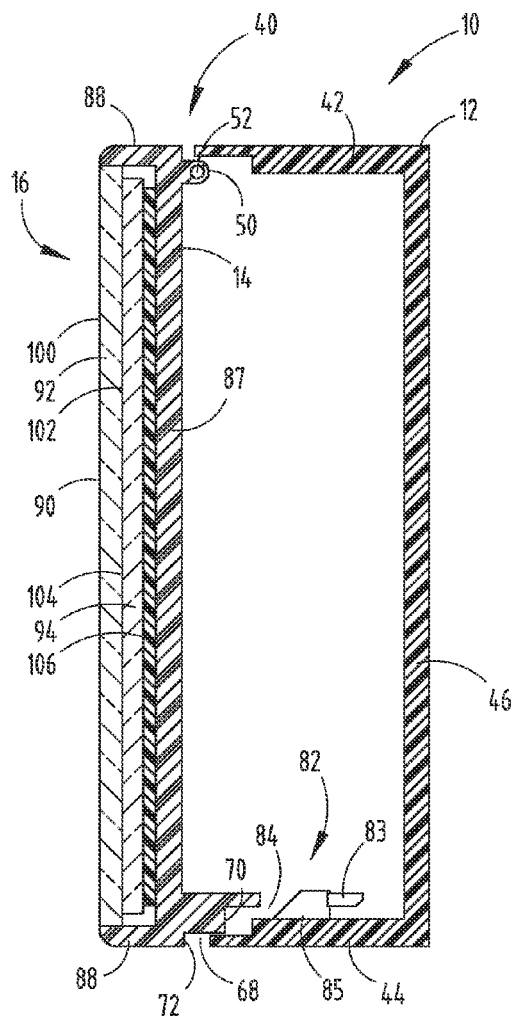
FIG. 3D is a third elevational cross-sectional view of the rearview assembly of FIG. 3A.
Figure 3E:
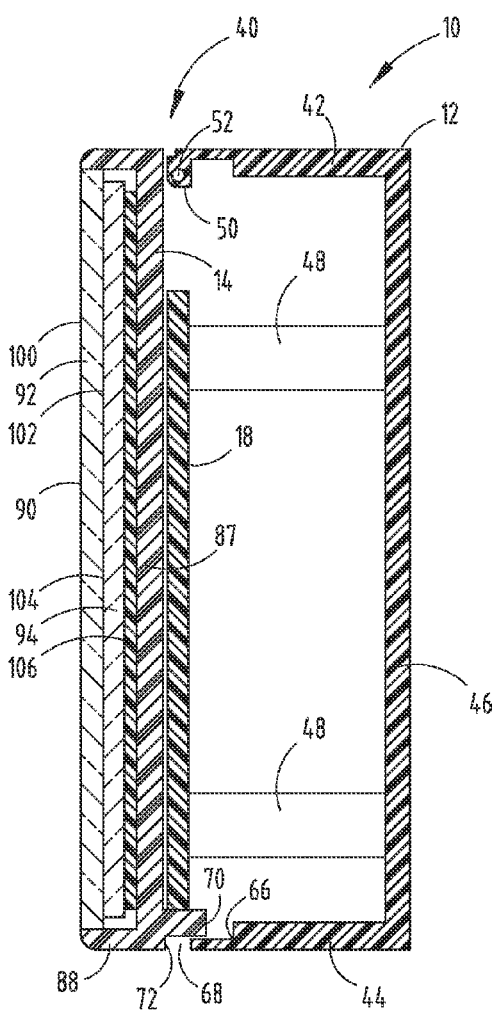
FIG. 3E is a fourth elevational cross-sectional view of the rearview assembly of FIG. 31.
Figure 4A:
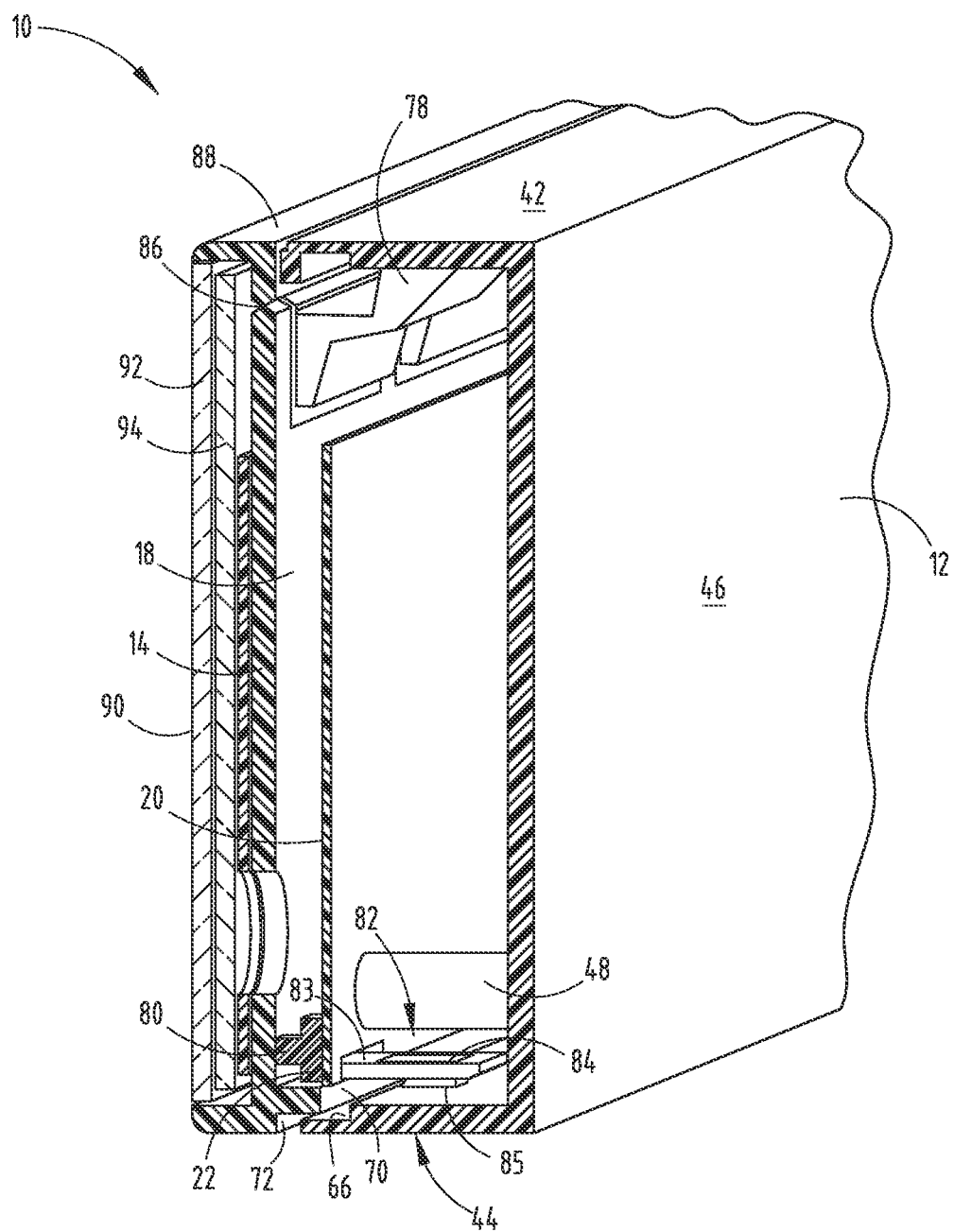
FIG. 4A is a top perspective cross-sectional view of another embodiment of a rearview assembly of the present invention.
Figure 4B:
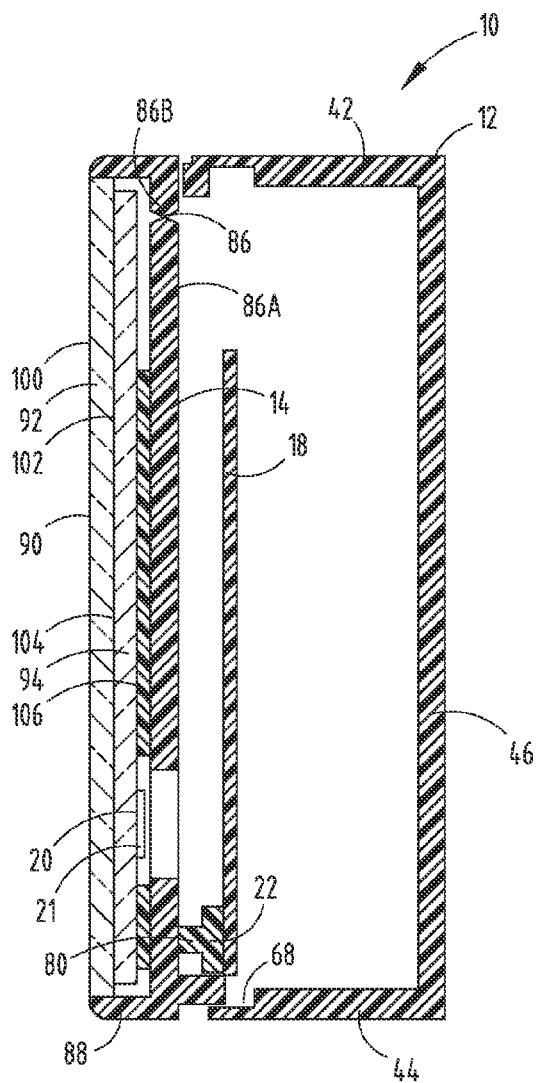
FIG. 4B is a first elevational cross-sectional view of the rearview assembly of FIG. 4A.
Figure 4C:
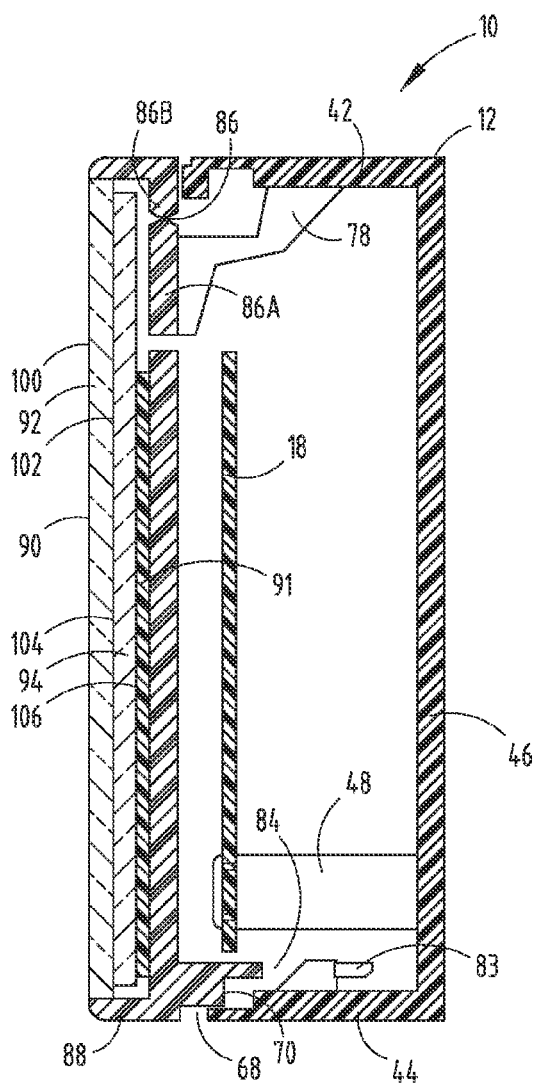
FIG. 4C is a second elevational cross-sectional view of the rearview assembly of FIG. 4A.
Figure 4D:
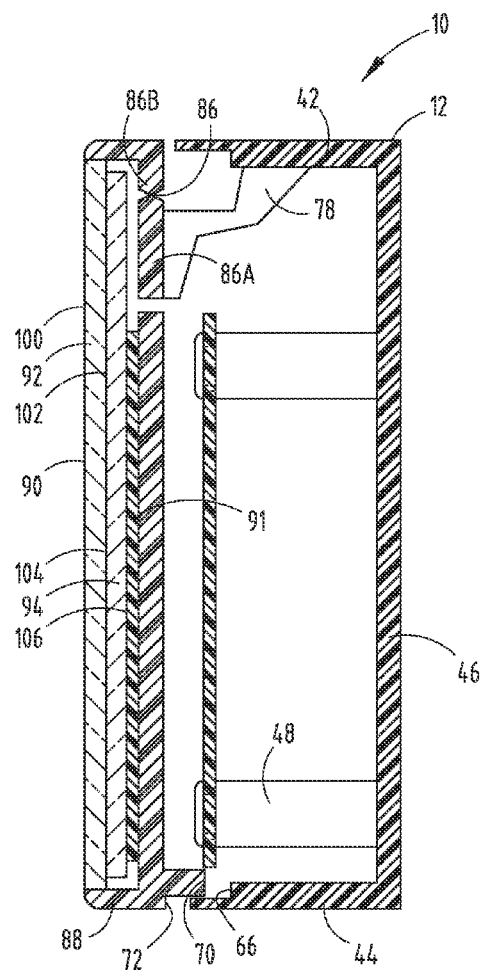
FIG. 4D is a third elevational cross-sectional view of the rearview assembly of FIG. 4A.
Figure 4E:
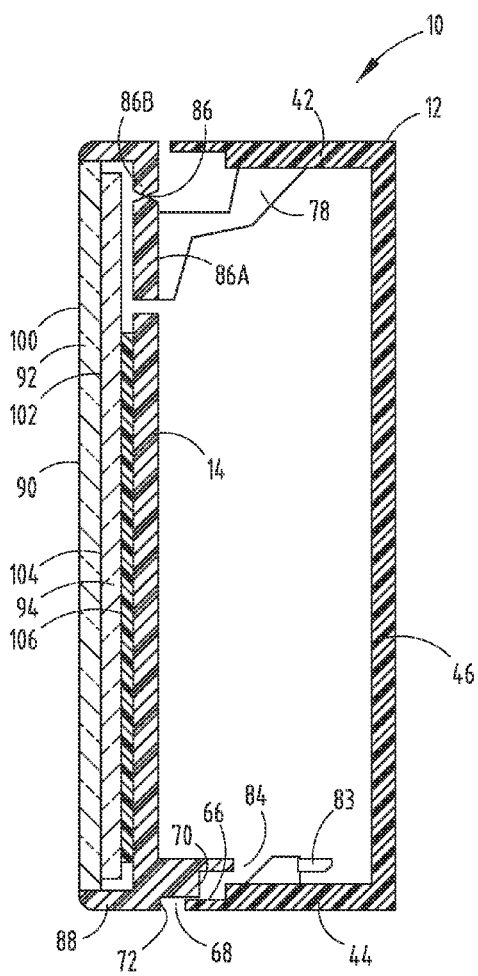
FIG. 4E is a fourth elevational cross-sectional view of the rearview assembly of FIG. 4A.
Figure 5A:
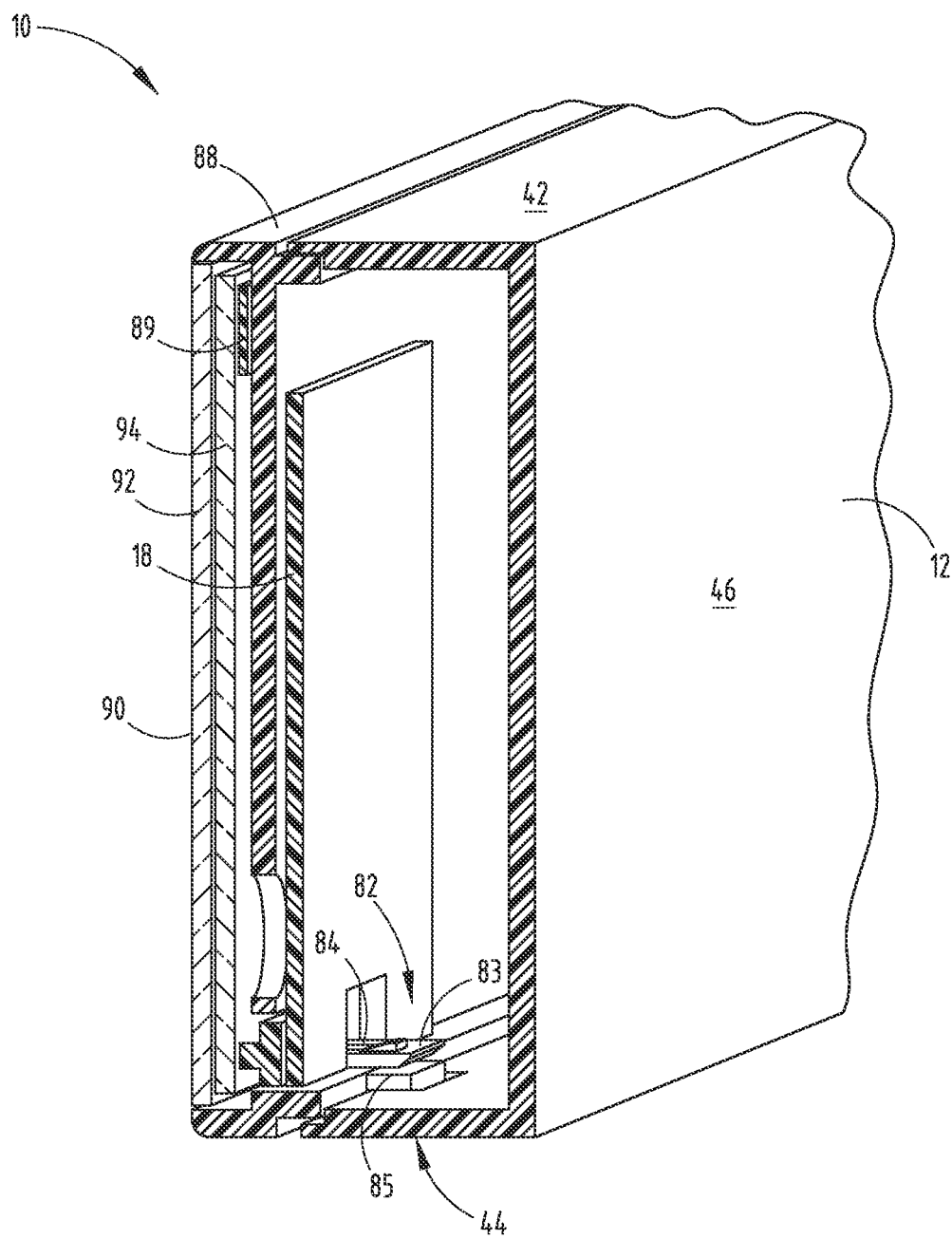
FIG. 5A is a top perspective cross-sectional view of another embodiment of a rearview assembly of the present invention.
Figure 5B:
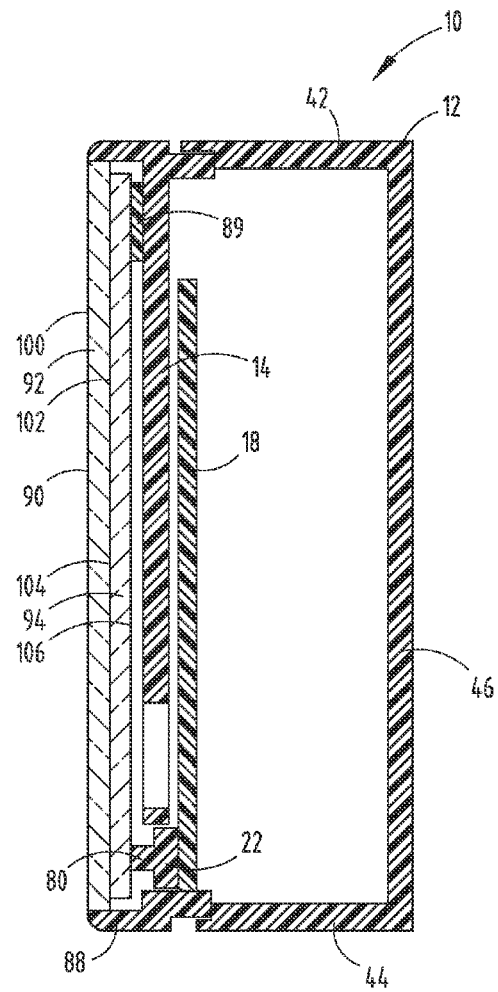
FIG. 5B is a first elevational cross-sectional view of the rearview assembly of FIG. 5A.
Figure 5C:
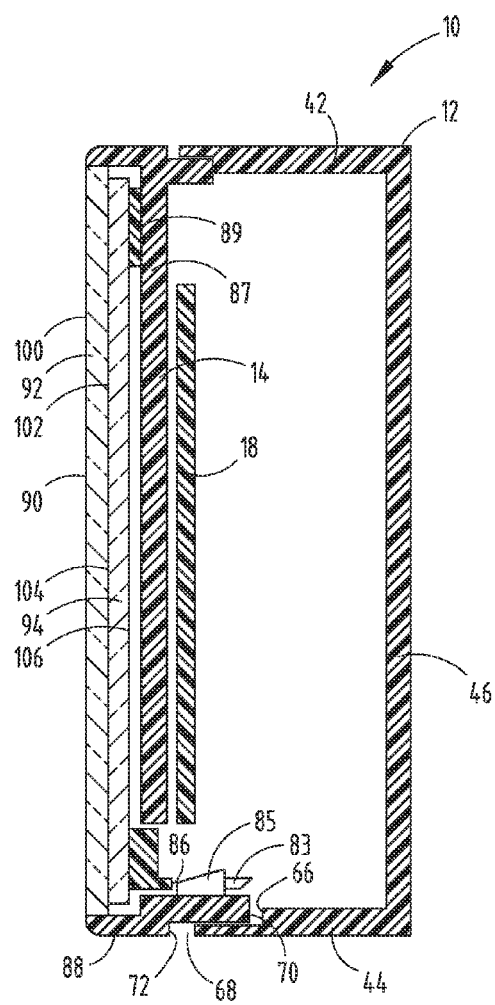
FIG. 5C is a second elevational cross-sectional view of the rearview assembly of FIG. 5A.
Figure 5D:
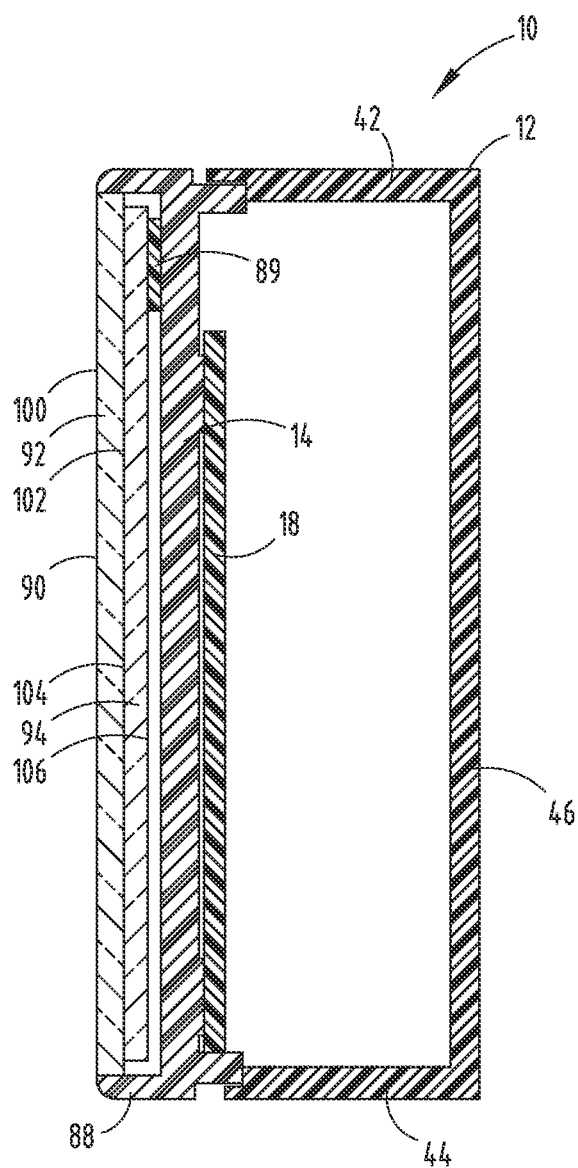
FIG. 5D is a third elevational cross-sectional view of the rearview assembly of FIG. 5A.

As illustrated in the embodiment depicted in FIGS. 3A and 3B, the switching assembly 22 may include any of a variety of switches, such as a tac or dome switch, that provides audile, visual, and/or tactile feedback to the user that the switch has been engaged. As shown in FIGS. 3A and 3B, a tac switch in the form of a button 80 is incorporated into the rearview assembly 10. The button 80 is directly or indirectly connected with the circuit board 18. The button 80 may be positioned behind the carrier 14 (FIG. 4A) or between the carrier 14 and the display 16 (FIG. 3A). In the illustrated embodiment, the button 80 is a mechanical-type switch that includes a plunger-type engagement member. However, it is contemplated that any of a variety of buttons, as understood by one having ordinary skill in the art, may be used in place of the button 80. As noted above, the first and second abutments 70, 72 prevent excessive rearward travel of the carrier 14 and display 16 relative to the mounting member 12. The first and second abutments 70, 72 effectively lessen the potential that the button 80 becomes damaged from being actuated with too much force. In addition, an overtravel device 82 is disposed between the carrier 14 and the mounting member 12. The overtravel device 82 includes a plate member 83 defining an aperture 84 adapted to engage a knob 85 that extends upwardly from the bottom wall 44 of the mounting member 12. The aperture 84 of the plate member 83 is designed to allow limited travel of the carrier 14 and display 16 in a forward direction relative to the mounting member 12, thereby preventing potential damage to the rearview assembly 10.

The switching assembly 22 is disposed on a bottom portion of the mounting member 12 opposite the mechanical hinge 40. The switching assembly 22 may include a multitude of switches or buttons. Application of pressure against the display 16 proximate the switching assembly 22 forces the engagement member of the button 80 rearward, thereby closing a circuit on the circuit board 18. When the circuit is closed, a feature or function of the rearview assembly 10 is activated. The feature or function activated depends on input from the sensing system 20.

It is also contemplated that the mechanical hinge 40 may be disposed on the bottom wall 44 of the mounting member 12 such that the carrier 14 rotates relative to the hinge pin 52 at a bottom portion of the mounting member 12. In this instance, the rearview assembly 10 would work similarly to the embodiment disclosed above, however, the overtravel features, as well as the switching assembly 22, would be disposed at a top portion of the rearview assembly 10 and the mechanical hinge 40 would be disposed on the bottom wall 44 of the mounting member 12.

In another embodiment of the present invention, as shown in FIGS. 4A-4E, the mounting member 12 and the carrier 14 are connected by way of a living hinge 86. The carrier 14 includes a first portion 86A fixedly connected to an internal support 78 of the mounting member 12, and a rotational portion 86B adapted to rotate relative to the first portion 86A. The rotational portion 86B of the carrier 14 rotates when pressure is applied to the display 16.

In yet another embodiment of the present invention, as shown in FIGS. 5A-5D, the mounting member 12 and the carrier 14 are connected by a single flexible compressible pivot member 89. The flexible compressible pivot member 89 acts similar to the living hinge 86 and allows movement of the carrier 14 relative to the mounting member 12. As the user applies pressure to the display 16 proximate the switching assembly 22, the flexibility of the compressible pivot member 89 allows rotation of the carrier 14 relative to the mounting member 12 such that the switching assembly 22 can be actuated.

Figure 6A:
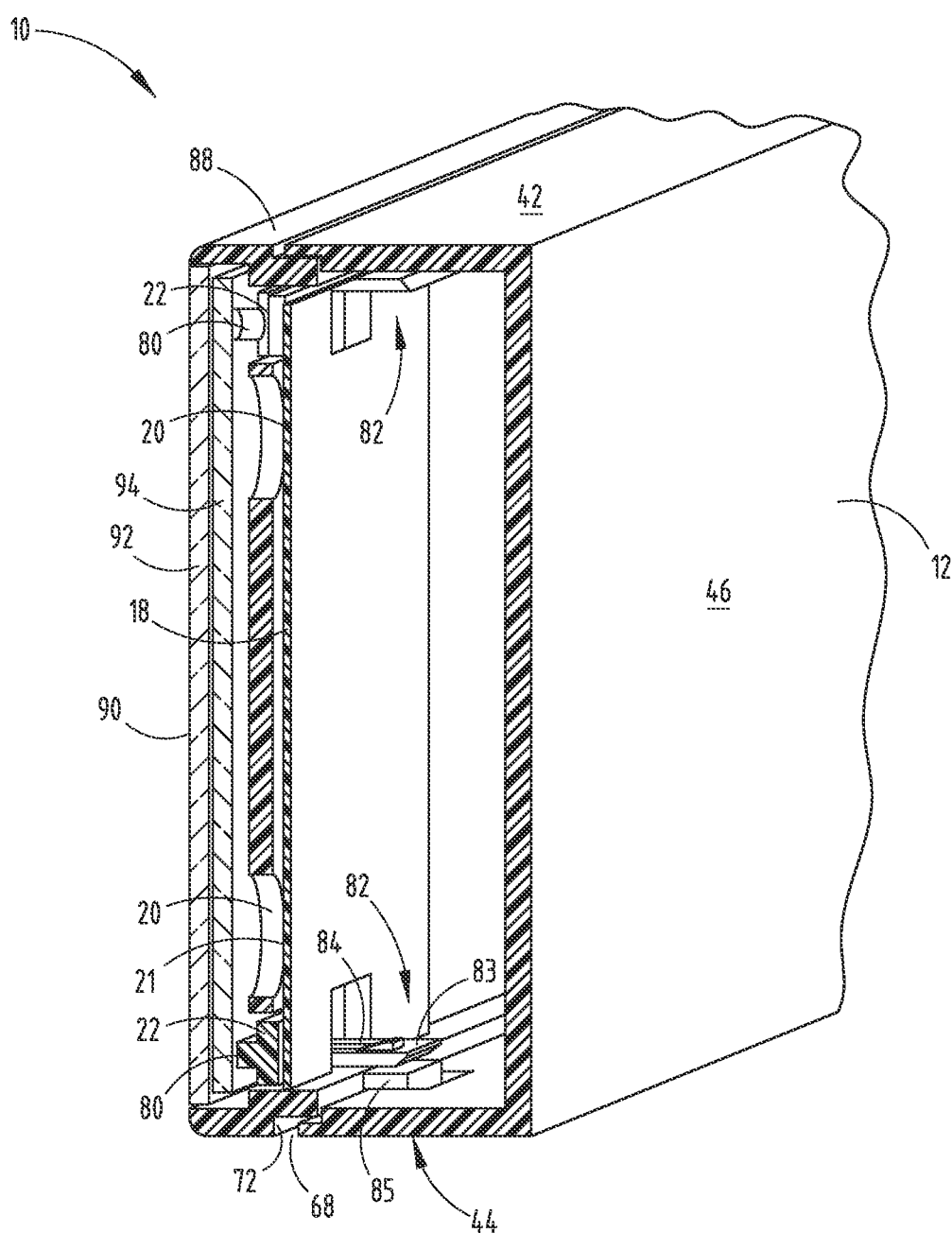
FIG. 6A is a top perspective cross-sectional view of another embodiment of a rearview assembly of the present invention.
Figure 6B:
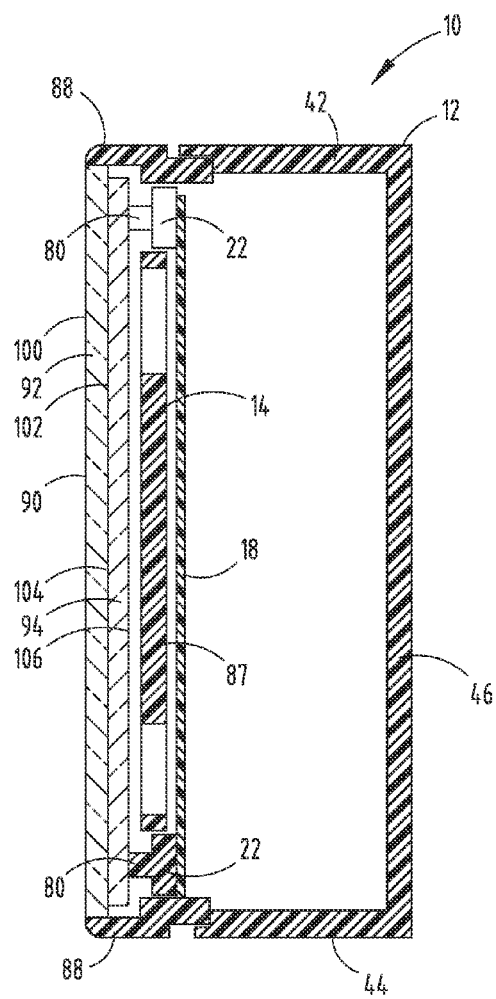
FIG. 6B is a first elevational cross-sectional view of the rearview assembly of FIG. 6A.
Figure 6C:
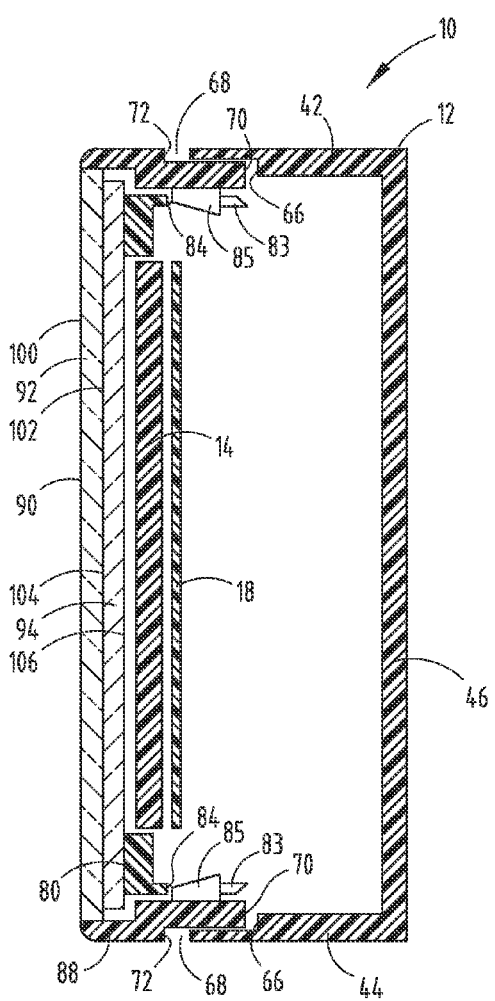
FIG. 6C is a second elevational cross-sectional view of the rearview assembly of FIG. 6A.
Figure 6D:
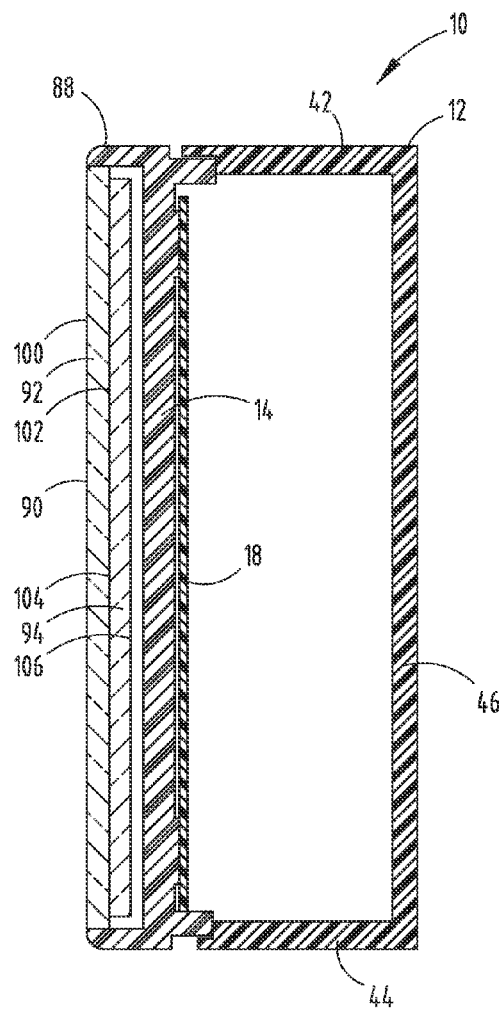
FIG. 6D is a third elevational cross-sectional view of the rearview assembly of FIG. 6A.
Figure 6E:
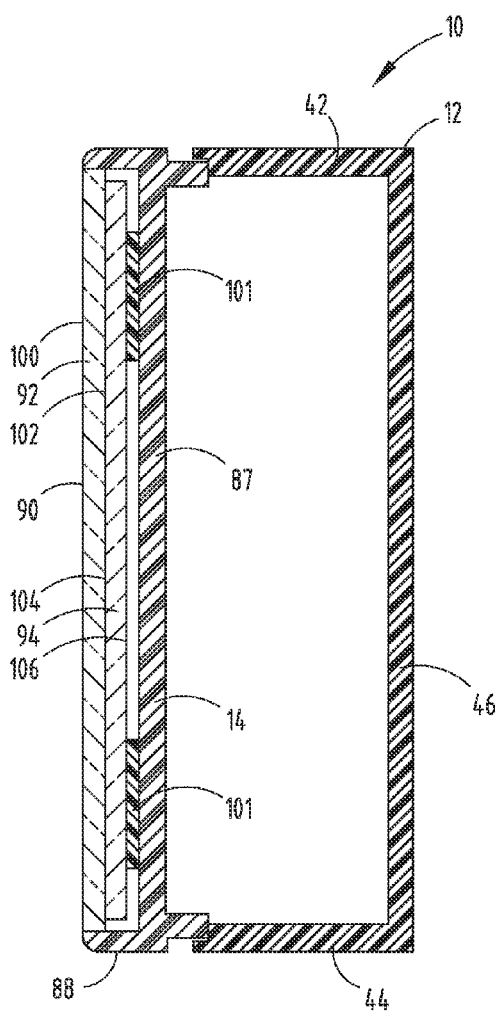
FIG. 6E is a fourth elevational cross-sectional view of the rearview assembly of FIG. 6A.
Figure 6F:
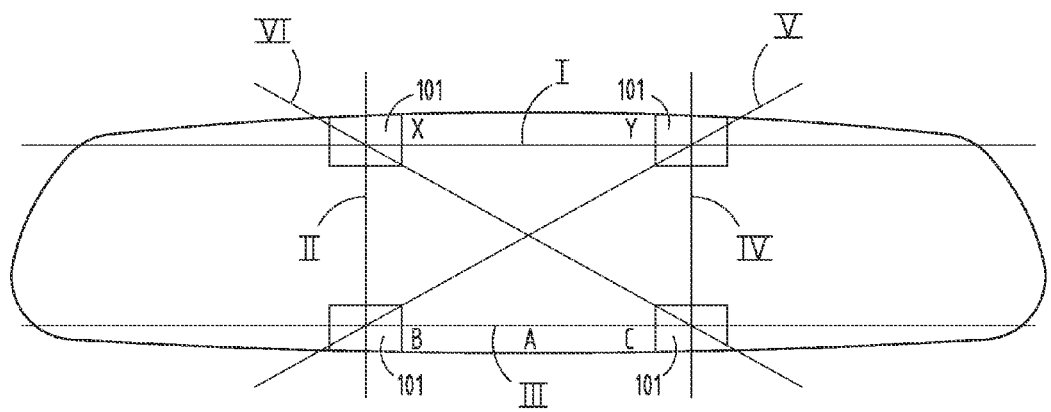
FIG. 6F is a fifth elevational cross-sectional view of the rearview assembly of FIG. 6A.

According to yet another embodiment of the present invention as illustrated in FIGS. 6A-6F, multiple compressible supports 101 are positioned both at a top portion and a bottom portion of the carrier 14 between the display 16 and the carrier 14. The illustrated embodiment includes multiple overtravel devices 82. The multiple compressible supports 1901 are generally comprised of a foam. Foam constructions that can be utilized include open cell, closed cell, or a hybrid thereof, such as an open microcell. The foam can be made from polyurethanes, such as polyester, polyether, as well as polyolefins, such as polyethylene. In addition, PVC, silicone, natural rubber (latex or polyisoprene based) and synthetic rubber, such as EPDM, can be used. The multiple compressible supports 101 serve to form multiple axes I, II, III, IV, V, and VI about which the display 16 can rotate (FIG. 6F). It is contemplated that any number of compressible supports 101 may be disposed between the display 16 and the carrier 14. Application of force or pressure by a user to the top portion of the carrier 14 to actuate the switching assembly 22 in combination with the sensing system 20 being activated by a conductive member results in a first function being carried out by the rearview assembly 10. Application of force or pressure to the bottom portion of the carrier 14 in combination with the sensing system 20 being in an activated condition results in a second function being carried out by the rearview assembly 10. In this embodiment, the switching assembly 22 may include a plurality of switches or buttons 80, which may be positioned around the periphery or internal portion of the rearview assembly 10. The force required to move the display can be altered based on the mechanical properties of the switching assembly or on the properties of the multiple compressible supports 101 (density, size, shape, etc.). The rearview assembly 10 may enable different features, depending on which axis I, II, III, IV, V, or VI the display 16 rotates relative to the carrier 14, as well as which direction the display 16 rotates relative to the carrier 14. It is also contemplated that this embodiment may be utilized without using the sensing system 20 at all, in which case the various buttons 80, when actuated, enable various functions of the rearview assembly 10.

Referring again to FIGS. 3A-6F, the carrier 14 is generally designed to support the display 16 and includes a plate 87, as well as a peripheral rim 88. The plate 87 may be a partial or a full plate that extends across the mounting member 12. The display 16 may include a reflective member, such as a static mirror assembly or a prism-type mirror assembly, as well as a display system, such as a liquid crystal display (LCD), or an electrochromic (EC) element 90. The illustrated embodiment shows the EC element 90 that is designed to rotate with the carrier 14 as the carrier 14 pivots relative to the mounting member 12. An adhesive or bonding strip 91 secures the EC element 90 to the carrier 14. The EC element 90 generally includes a front or first substrate 92, as well as a rear or second substrate 94. The second substrate 94 includes a reflective layer. The front substrate 92 includes a first surface 100 and a second surface 102. The rear substrate 94 includes a third surface 104 and a fourth surface 106. The EC element 90 includes a transparent conductive oxide disposed between the second surface 102 of the front substrate 92 and the third surface 104 of the rear substrate 94 that is adapted to darken when a current is applied to the transparent conductive oxide. As a result, the apparent reflectiveness of the rearview assembly 10 lessens.

With regard to the embodiments illustrated in FIGS. 3A-6F, various switching assemblies 22 having different constructions can be utilized. For example, the display 16 may move relative to the buttons 80, which are connected with the circuit board 18, mounted to the carrier 14. Having the circuit board 18 mounted to the carrier 14 has the advantage of lowering the total moving mass during actuation of the switching assembly 22, which consequently provides vibration advantages.

Because the display 16 moves relative to the circuit board 18, a gap may be developed between the display 16 and the sensing areas 21. The gap can be filled by providing a conductive mechanical riser to fill the gap and place the sensing area 21 closer to the display 16 and conductive member or finger. The conductive mechanical riser can be a coil or a lever arm spring, and can be either capped with a large area conductor to increase surface area, or can be connected to a conductive coating or circuit attached to the display 16. Alternatively, a dielectric material can be used to fill the gap. This material can also double as an optical element, typically as a diffuser for backlighting indicia disposed on the display 16.

The conductive mechanical riser can be constructed from a compressible conductive material, such as a conductive compressible closed cell foam. Conductive elastomeric connections may also be used. The compressible conductive material can be used as part of the return mechanism for the EC element 90. The dielectric material can be constructed of a fixed thickness dielectric or a compressible material. If a fixed thickness material is used, it is beneficial to leave as little air gap as possible between the display 16 and the sensing areas 21. Because air is a poor dielectric material, as the air gap is decreased, the signal-to-noise ratio is improved.

Because the display 16 can be an LCD or EC element 90 that includes a dielectric material that contains conductive areas, moving the display 16 relative to the sensing areas 21 can cause a measurable signal change on each channel of the capacitive sensing circuit, even if a conductive member, such as a finger, is not in the immediate vicinity of the sensing area 21. The change in signal by moving the display 16 can be significant compared to the amount of signal generated by placing a finger on the display 16, particularly if the user is wearing a thick glove, which can result in a small registered signal.

Because each sensing area 21 can have a slightly different shape and connection path, the capacitive offset created by moving the display 16 is channel specific. This capacitive offset can be characterized and stored in a memory location of a controller or a processor connected with the sensing system 20. The sensitivity of each channel can also vary channel to channel because of different mechanical designs (slightly curved outside buttons for example can have a different sensing area 21 compared to the center buttons.) This sensitivity/gain factor is also stored in the memory location of the controller.

Several processes can be implemented to compensate for different channel sensitivities and offsets. For example, in one embodiment, long term filtering and averaging is used to calculate a baseline for each channel. In this application, the updating of the baseline is not performed when it has been determined that contact has been made with the display 16 (the display 16 has been pressed). Not updating the baseline prevents sudden or abrupt drift of the baseline. In one embodiment, the samples just prior to the press, and just after the press may be ignored. Each channel is adjusted by subtracting the previously characterized offset value. Each channel is then compensated by multiplying the gain/sensitivity value previously developed. The signal values associated with each channel are then compared to one another to determine which channel has the largest signal change. Rules checking can also be performed on the remaining values in a manner similar to other known capacitive sensing applications. For example, the input can be ignored if it does not exceed a predetermined threshold, or if more than one channel has a significant signal. In some instances, the signal values may be measured during a known quiet time, such as before a vehicle starts, with little or no ambient noise.

Alternatively, in another embodiment, the display 16 may be attached to the circuit board 18, which moves as a single unit relative to the carrier 14. When the circuit board 18 is attached to the display 16, the distance between the circuit board 18 and the display 16 remains substantially constant. Since the distance does not generally change between the circuit board 18 and the display 16, a variable offset to the measured capacitance signals is not generated. A wire, solderless connection, such as that disclosed in PCT/US11/043191, entitled "AUTOMOTIVE REARVIEW MIRROR WITH CAPACITIVE SWITCHES," the entire disclosure of which is hereby incorporated by reference in its entirety, or a conductive rubber may be used to decrease wire fatigue. Consequently, a consistent capacitive signal is produced. Gain compensation and offset or baseline compensation can be used with methods commonly used in other capacitive touch applications, as understood by those having ordinary skill in the art. The resulting signals are then compared against each other to find which channel has the most significant change. Rules checking can also be applied.

It will be understood that devices other than a button or a tac switch can be used to determine that a function designated by indicia on the display 16 has been selected. For example, a capacitance change can be measured on individual sensing area 21 channels. In this instance, all channels monitor an increase in signal on movement of the display 16. Another example includes measuring a capacitance change on dedicated capacitance channels that primarily sense the conductive coatings disposed on the display 16. Yet another example includes measuring optical reflectance. In this instance emitter/detector pairs are aligned and aimed at the display 16. The emitter/detector pairs can measure changes in reflectance as the display 16 moves. Still another example includes using optical interrupter sensors where a flag is added to the moving display 16 to break a light beam on the stationary base when the flag moves with the display 16. Alternatively, the flag can be added to the stationary base and the optical interrupter sensors can be attached to the moveable display 16. Other technologies that measure voltage differential across an electrical conductor, such as the hall effect, can also be employed.

Figure 6G:
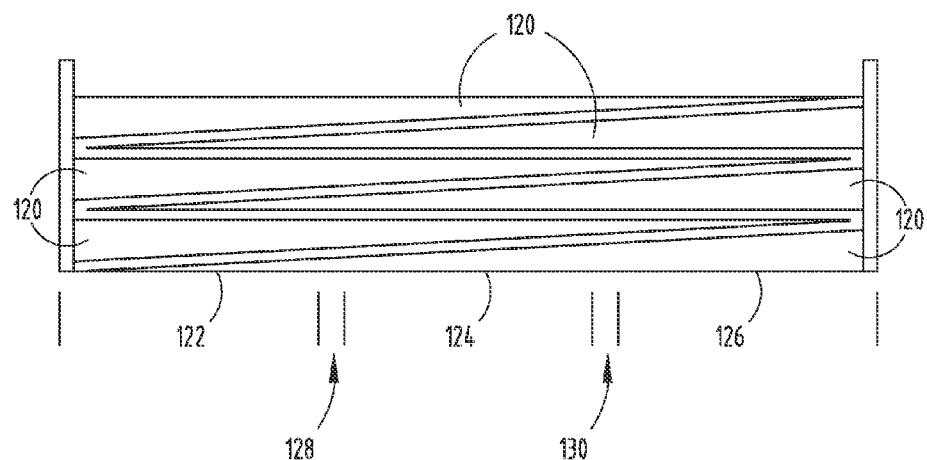
FIG. 6G is a front elevational view of a slider system for use with the rearview assembly of the present invention.

It will also be understood that alternate methods to detect the location of a conductive member, such as a finger, can be utilized. For example, a resistive touch screen can be applied as an additional layer of glass over the entire surface of the display 16. Alternatively, the touch screen can be provided proximate only a button area of the rearview assembly. Another example includes using optical infrared emitter/detector pairs. The emitter shines light out of the surface of the display 16, and the detector measures the returned light. The controller enables a predetermined function if the detector indicates that the returned light exceeds a minimum, for example, by reflecting off of the finger of a user. Visible light optical sensing may also be utilized. Alternate capacitive architectures may also be used. For example, a capacitive slider may be implemented that includes interleaved triangles 120 that are used to sense pressure from the finger of a user (FIG. 6G). Increased capacitance by movement of the glass will be applied to both channels. Gain and offset correction would be applied to both channels. The amount of signal measured by each channel will vary based on where the finger of the user is placed. The ratio of the two signals or contribution to the total can therefore be used as an indication of the horizontal position of the finger, which can identify an intended button press location 122, 124, or 126 selected by the user. Signals falling between valid regions in transition zones 128, 130 would be rejected.

It is also contemplated that in addition to using capacitance to measure the presence of a finger, capacitance may be used to measure the force that is applied. The applied force can be determined by measuring the amount of travel of an element proximate a compressible element. The capacitance of the coatings of the display may be sensed instead of sensing the additional capacitance of an approaching finger. This process allows the rearview assembly to be independent of variables (such as limited capacitance) caused by a user wearing gloves, and does not require any special processing to isolate regions of the coatings of the display. As with other capacitance based sensors, a baseline is typically measured or learned, and the response is generally defined as the change from the baseline.

In the event a single function is desired, a single sensor assembly may be used to detect the small motion that occurs when the display 16 is pressed by a user. Compliant foam or various hinge and spring mechanisms, as disclosed herein, may be used to generate sufficient motion proximate the desired sensor. The force that is required to activate the function may be set in software by using programmable thresholds.

Figure 6H:
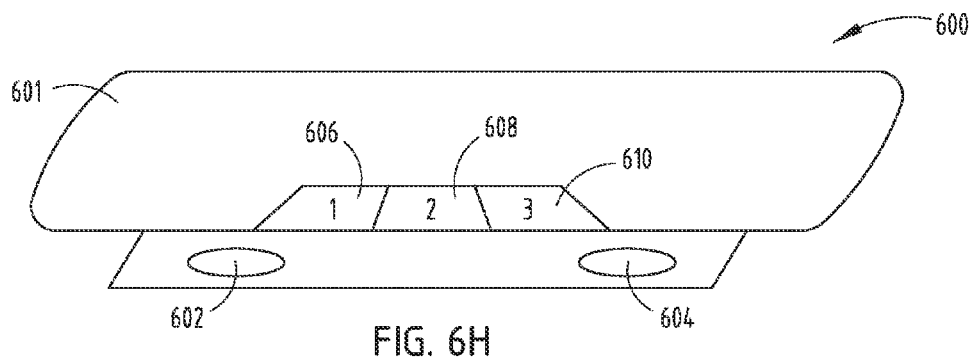
FIG. 6H is a front elevational view of another embodiment of a rearview assembly of the present invention.
Figure 6I:
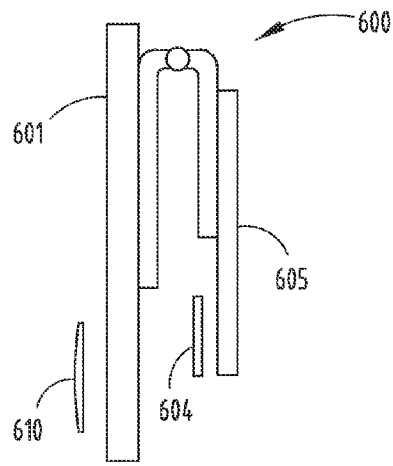
FIG. 6I is a side cross-sectional view of one embodiment of a switching assembly of the present invention.
Figure 6J:
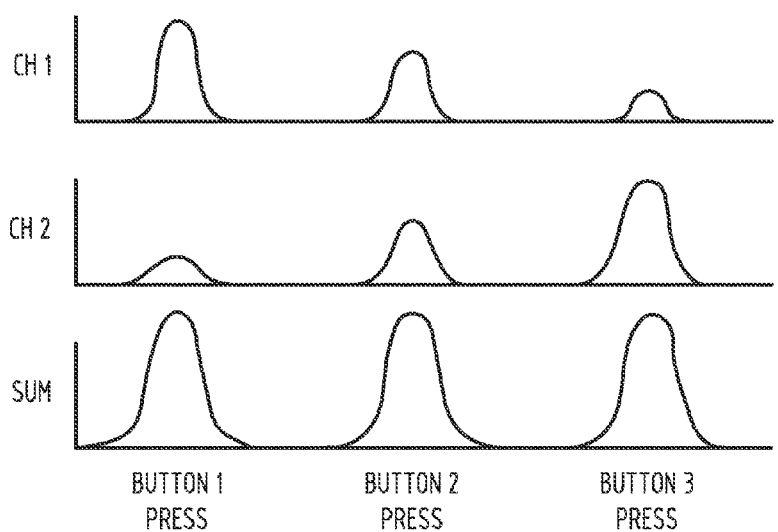
FIG. 6J is a schematic view illustrating force values based on a location of a press.

Referring now to FIGS. 6H and 6I, another embodiment of a rearview assembly 600 is illustrated where multiple functions are desired and multiple pressure sensors (e.g., mechanical switches) may be placed proximate the perimeter of a display 601. In an alternative embodiment, two or more pressure sensors 602, 604 coupled with a circuit board 605 may be utilized to determine applied pressure as well as location. More specifically, the sum of the two pressure sensors 602, 604 can be used to determine the force of the press, and the ratio or difference between the values of the pressure sensors 602, 604 may be used to determine the location of the press. This process can be used to create virtual buttons 606, 608, 610. Indicia 1, 2, and 3 can be applied at the locations where a user should press (FIGS. 6H and 6I). As shown in FIG. 6J, the pressure sensors 602, 604 can respond to presses on the left virtual button 606, the center virtual button 608, and the right virtual button 610. The measured response by software coupled to the virtual buttons 606, 608, 610 will vary, depending on which virtual button 606, 608, 610 is pressed. Any number of virtual buttons can be created in this way.

Detecting that one of the virtual buttons 606, 608, 610 has been pressed is done by comparing the sum of the values of the pressure sensors 602, 604 to a predetermined threshold. A determination as to which virtual button 606, 608, 610 is being pressed can be made based on the difference between values of the pressure sensors 602, 604 as a percentage of the sum. For example, the function of the right button 610 may be activated if the sum of the two values is high enough and if the difference between the two values is greater than one third of the sum. To improve reliability of the rearview assembly 10, the responses of each pressure sensor 606, 608, 610 may be characterized, and gain and offset constants may be applied to the data of each sensor 606, 608, 610 before the sum and difference are calculated.

As the relationship between values may be somewhat unpredictable during transitions, de-bounce times can be structured into software that evaluates the location and force of contact made by a user when pressing a virtual button. In addition, any foam material used as a compliance element may require time to return its original shape (the original dimension of the foam material). Accordingly, the button detection software should include functionality preventing a sudden change in output, thereby avoiding sporadic changes in button detection when the button is released.

The embodiment of a rearview assembly 600 illustrated in FIG. 6H generally includes the virtual buttons 606, 608, 610 located between the pressure sensors 602, 604. However, it is also possible to have the virtual buttons 606, 608, 610 located outside the sensing pad positions. Applying pressure to these areas will compress one sensor, and may create negative (outward) travel at the other sensor location.

To prevent or at least decrease accidental triggering of an adjacent virtual button, zones can be provided between virtual buttons that are locked out in the software. This can be accomplished by monitoring the difference between values, and setting limits for appropriate values. If the difference between channel values falls outside the predetermined limits, the software will not initiate a function linked to any of the buttons.

To increase the sensitivity of a capacitance based pressure sensor, travel distance can be set as a substantial percentage of the un-pressed gap. A dielectric material may be used to decrease the air gap, or a metal conductor may be placed on a carrier plate to be used as a sensing target. If it is not convenient to provide a ground path to the sensing target, interleaved sense traces and ground traces may be used on the PCB, similar to that illustrated in FIG. 6G, but generally smaller in size. Bringing the traces closer to the sensed target generally increases the capacitive coupling between the traces. Any small motion of the sensor PCB relative to the mount or other large conductive object (such as the mounting hardware) can sometimes create undesirable changes in signals. Accordingly, the opposite side of the sensing pad away from the target can be outfitted with adequate ground shielding.

Figure 6K:
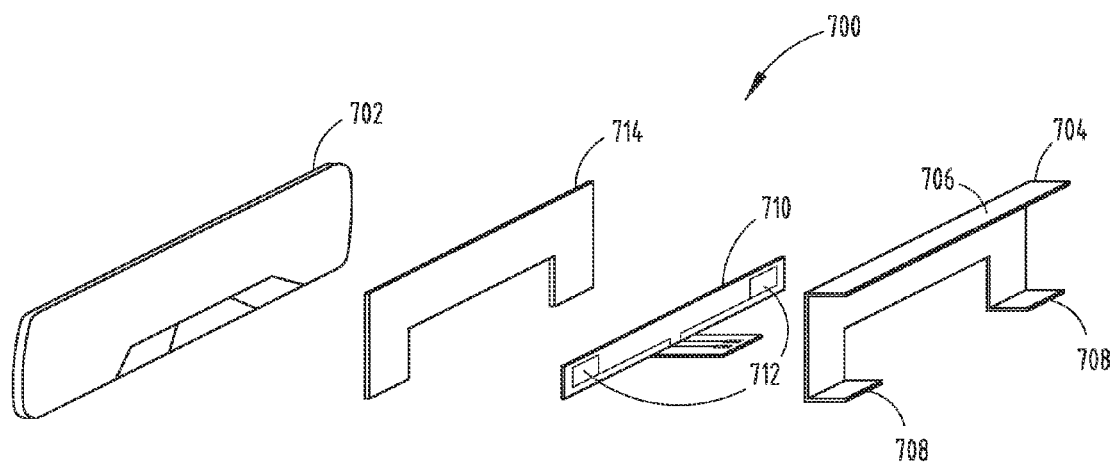
FIG. 6K is a top perspective exploded view of another embodiment of a rearview assembly of the present invention.
Figure 6L:
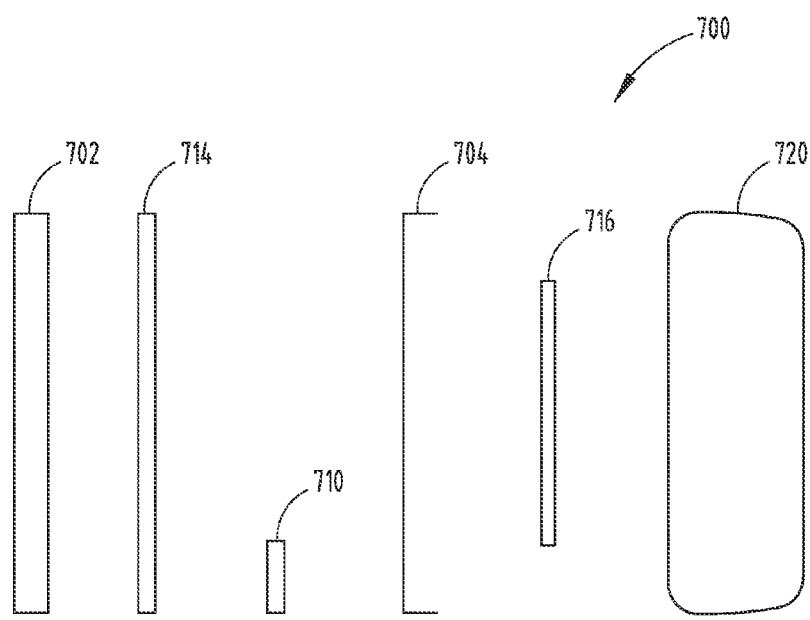
FIG. 6L is a side elevational view of the rearview assembly of FIG. 6K.

FIGS. 6K and 6L generally illustrate an embodiment of a rearview assembly 700 that requires little force to achieve reasonable travel of an element 702. In this instance, a carrier plate 704 is attached along a top rail 706 and at two lower tabs 708. A flex circuit 710 with sensing pads 712 is attached to the lower tabs 708, and is separated from the element 702 by a foam tape 714. The flex circuit 710 is operably connected to a circuit board 716. Because of the small area at the lower tabs 708, only light pressure is required to compress the foam tape 714. For a given amount of pressure, the change in capacitance between coatings on the element 702 and the sensing pads 712 is therefore increased. It is also possible to achieve a similar effect by varying the layout of the foam tape 714. The entire rearview assembly 700 is supported in a housing 720.

Figure 6M:
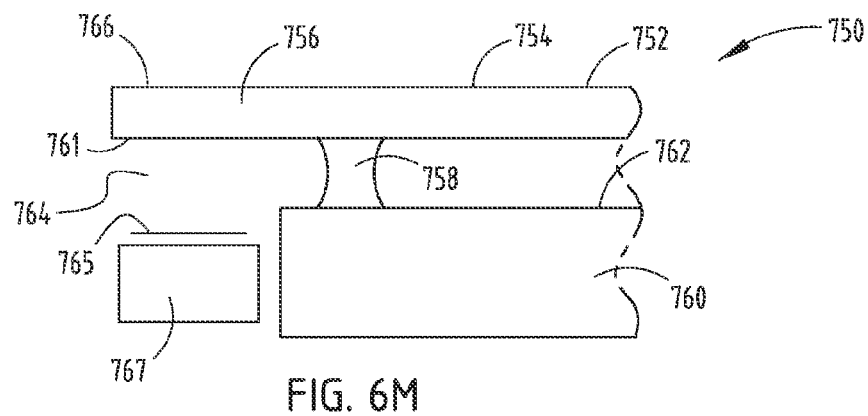
FIG. 6M is a partial side elevational view of one embodiment of a sensing system of the present invention.
Figure 6N:
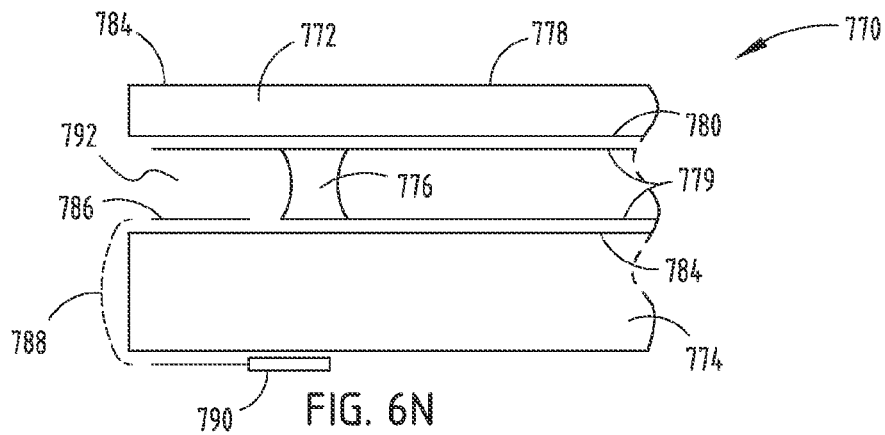
FIG. 6N is a partial side elevational view of another embodiment of a sensing system of the present invention.

In alternate embodiments generally illustrated in FIG. 6M, a rearview assembly 750 relies on flexure of a glass or a reflective element 752 of a display 754. In the illustrated embodiment of FIG. 6M, the display 754 is disposed on a front substrate 756. A seal 758 is disposed between the front substrate 756 and a rear substrate 760. An inside surface 761 of the front substrate 756 and an inside surface 762 of the rear substrate 760 is coated with a conductive material. As shown in FIG. 6N, a variable gap 764 is provided between a sensing pad 765 and the inside surface 761 of the front substrate 756. Application of pressure to a virtual button 766 on the display 754 results in the variable gap 764 decreasing, which is sensed by the sensing pad 765, and a signal is sent to a circuit board 767.

It is also generally contemplated that functionality may be applied to the rearview assembly that provides notification to a user that a button or sensor is getting close to being activated. The notification may be audible, tactile, visual, etc. The notification may also be used to indicate that a user should apply additional pressure to activate a particular function. It is also contemplated that double-clicking a particular virtual button can provide different functionality.

In a similar embodiment shown in FIG. 6N, a rearview assembly 770 includes a front substrate 772, and is connected to a rear substrate 774 separated by way of a seal 776. A display 778 is disposed on the front substrate 772. A conductive coating 779 is placed on an inside surface 780 of the front substrate 772 and an inside surface 782 of the rear substrate 774. Upon application of pressure to a virtual button 784, an isolated coating 786 senses natural flexing of the front substrate 772. A conductive bridge 788 relays a signal to a circuit board 790. If the front substrate 772 of the display 778 is thin enough, and a gap 792 between the display 778 and the isolated coating (sensor) 786 is small enough, the natural flexing of the display 778 can be used to sense pressure, unlike methods using a variable gap with a compliant material.

Although it can be desirable to sense element coatings in some instances, in another embodiment, the structure is reversed such that the sensing pads are stationary relative to the element, and a ground target such as the mount or conductive material in the housing is sensed. Either method is acceptable, as long as the distance between the sensing pad and target change with pressure.

Figure 6O:
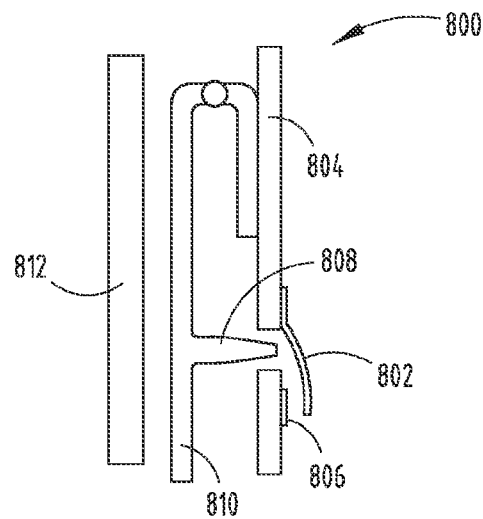
FIG. 6O is a side cross-sectional view of one embodiment of a switching assembly of the present invention.

In the illustrated embodiment of a rearview device 800 generally shown in FIG. 6O, a grounded conductive tab 802 is shown attached to a circuit board 804 that is in close proximity to a sensing pad 806. A post 808 in a carrier plate 810 forms a gap between the grounded tab 802 and the sensing pad 806 to change when an element 812 is pressed.

Because the assemblies described herein can detect where pressure is applied, it becomes possible to detect various gestures applied by a user. A left to right swipe could, for example, be used to change between items in a menu. It is also understood that by adding additional pressure sensors to the methods described herein, both horizontal and vertical position measurements may be achieved. This functionality allows for vertical scrolling, or touch screen type applications. In those instances where a pressure only system is desirable, audible, visual, or tactile feedback functionality may be implemented. For example, an indicator may be illuminated or a sound may be activated. The feedback may be provided at the display 16, or provided remotely.

If the likelihood of accidental activation is high, it may be desirable to make some buttons harder to press than others. This may be the case for a button that contacts emergency services, or one that closes a garage door. In purely mechanical configurations, this can be accomplished by recessing the button within an opening. With the moving glass implementation, the thresholds for activation may be set to higher values in the software, or the spring rates of the materials in the button area may be increased.

In addition to the capacitance based pressure sensing techniques described herein, resistive pressure based sensors may also be used. For example, conductive elastomers may be placed between the PCB and the carrier plate, and can be used to bridge pads on the PCB. When used as part of a resistive voltage divider, a voltage can be created that varies with pressure. This may be read with an A/D input to a microprocessor.

Various sensing systems 20 may also be utilized in the embodiments illustrated in FIGS. 3A-6F. The sensing system 20 may be disposed on the display 16. However, it is generally contemplated that the sensing system 20 will be disposed about a periphery of the display 16, but could be disposed on any portion of the display 16. If the display 16 includes the EC element 90, the sensing system 20 may be disposed on the first surface 100, the second surface 102, or the third surface 104 of the EC element 90. Each sensing area 21 of the sensing system 20 is operable between an activated condition and a deactivated condition. It will be understood that each sensing area 21 can be activated when that particular sensing area 21 measures an engagement value that exceeds a minimum threshold value. The engagement value may be measured by a change in capacitance, resistance, pressure, position, angle, etc. It will also be understood that the sensing system 20 is deactivated when no sensing area 21 has met the minimum threshold value, and therefore, no particular feature or function of the rearview assembly 10 has been selected by the user. In one embodiment, where multiple sensing areas 21 measure an engagement value that exceeds the minimum threshold value, the controller enables the function associated with the highest engagement value and disregards the rest. The selection of two sensing areas 21 can result in operation of a different function or feature than either of the sensing areas 21 enabled separately. In another embodiment, the function that is associated with the sensing area 21 that has the largest response value (after gain/offset correction) resulting from engagement by a conductive member, is the function that is enabled. Logic controls can also be applied and have rules that permit enablement of simultaneous functions with only certain sensing areas 21.

The sensing system 20 is operably connected with the circuit board 18 such that when the switching assembly 22 is actuated, the sensing system 20 detects which of one or more possible features associated with the position of the sensing areas 21 have been selected by a user and forwards that information to a processor connected with the circuit board 18. Each of the sensing area positions is associated with a predetermined function performed by the rearview assembly 10 and the simultaneous selection of several sensing area positions may be associated with other predetermined functions. The sensing system 20 detects which sensing area 21 is activated and communicates a signal to the processor. The processor determines the feature based upon the received signal. Based on the sensing area position detected by the sensing system 20 and the actuation of the switching assembly 22, the proper function is enabled by the rearview assembly 10.

The sensing area 21 may be disposed on any of the first, second, third, and fourth surfaces 100, 102, 104, 106, depending on the application. If the sensing area 21 is disposed on the third surface 104 or fourth surface 106, then the gap between the second surface 102 and the third surface 104 can be filled with an isolated conductor or a dielectric to increase performance.

The sensing areas 21 of the sensing system 20 may include one or more electrical contacts 110 disposed at any of a variety of sensing area positions on the display 16 or EC element 90. The electrical contacts 110 are designed to sense the touch of a conductive member that is applied to the display 16 or the EC element 90. The electrical contacts 110 and the sensing system 20 may utilize any of a variety of technologies, as disclosed in detail herein. Indicia A, B, C, X, and Y are disposed on the display 16 proximate each sensing area position and relay functional information to the user so that the user knows what feature will initiate when a particular electrical contact 110 is activated.

Figure 7:
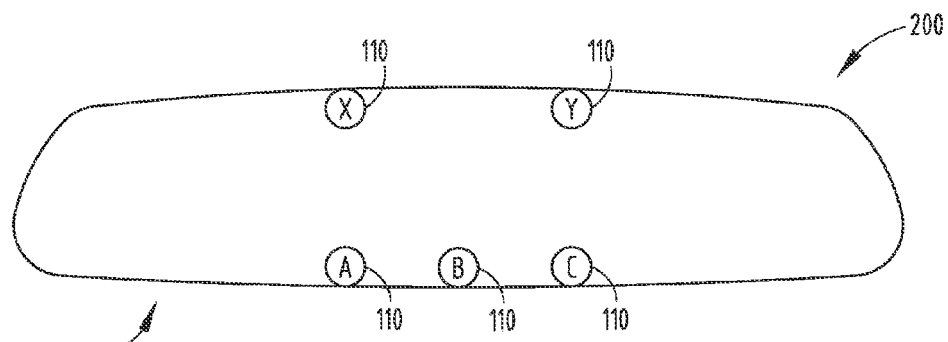
FIG. 7 is a front elevational view of a sensing system according to one embodiment of the present invention.

Referring now to the embodiment illustrated in FIG. 7, the sensing system 20 may incorporate any of a variety of technologies, such as capacitive sensing technology. With capacitive sensing technology, a sensor is formed from a material, such as indium tin oxide (ITO), copper, or a conductive ink. The sensor may be disposed on a printed circuit board (PCB), or on one of the first, second, third, or fourth surfaces 100, 102, 104, 106 of the EC element 90. A conductive member is positioned on the PCB or the first, second, third, or fourth surfaces 100, 102, 104, 106 of the EC element 90 and a small voltage is applied to the conductive member, resulting in a uniform electrostatic field. When the conductive member, such as the finger of a user, contacts or nearly contacts a conductive layer, the conductive member effectively acts as a capacitor. A controller or processor operably connects with the capacitive sensor to determine the location of the contact (or near contact) based on the change in capacitance as measured on the rearview assembly 10. The larger the change in capacitance to a particular sensor, the closer the conductive member is to that particular sensor. The sensor that has the largest change of capacitance is determined by the controller or processor to be the selected function of the user and would be the function carried out after the switching assembly 22 is actuated. In the illustrated embodiment, the sensing system 20 includes a capacitive sensor 200 such that the touch of a conductive member (i.e., a finger of a user) changes the capacitance across the display 16. When the capacitance changes, the sensing system 20 determines and confirms the location of the touch of the conductive member. The display 16 or the EC element 90 may include a transparent conductor that is disposed in front of or behind the front substrate 92 or by a protective coating. The protective coating can be applied over the display, and in particular, over any indicia disposed in the first surface 100. The protective coating can have a gray or possibly a flat or matte appearance to lessen the appearance of fingerprints left by a user, as generally disclosed in U.S. patent application Ser. No. 13/470,147, entitled "REARVIEW ASSEMBLY FOR A VEHICLE," filed on May 11, 2012, and U.S. patent application Ser. No. 13/271,745, entitled "CLEAR BEZEL," filed on Oct. 12, 2011, the disclosures of which are hereby incorporated by reference in their entirety.

Figure 8:
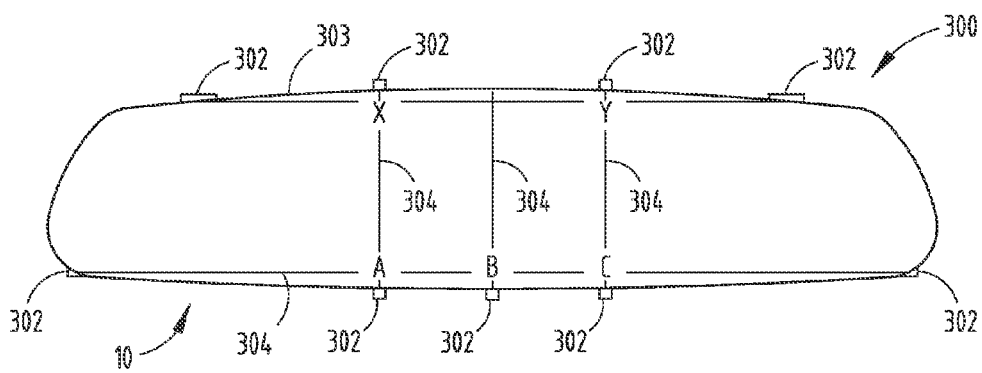
FIG. 8 is a front elevational view of another sensing system according to one embodiment of the present invention.
Figure 9:
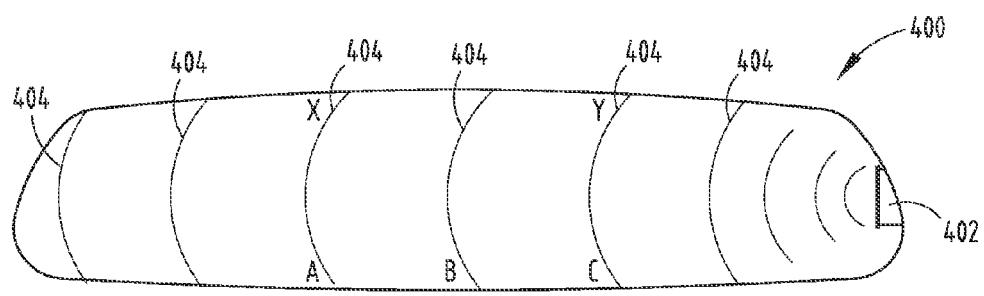
FIG. 9 is a front elevational view of yet another sensing system according to one embodiment of the present invention.

In another embodiment as illustrated in FIG. 8, the sensing system 20 includes an infrared sensor system 300. Small light emitting diodes (LEDs) 302 are disposed around a periphery 303 of the EC element 90. The small LEDs 302 emit light beams 304 in both the X and Y directions over the surface of the display 16. When the user breaks the light beams 304 at a given location, the X and Y coordinates are determined by a controller operably connected with the circuit board 18, which consequently activates a predetermined function of the rearview assembly 10. Any number of touch positions may be provided based on the number of LEDs 302 in the horizontal and vertical directions.

Yet another embodiment of the present invention (FIG. 9) includes a surface acoustic wave system 400 for the sensing system 20. The acoustic wave system 400 includes a transmitter 402 that sends an acoustic wave 404 over the display 16 or EC element 90. Any modifications to the propagation path will affect the velocity and amplitude of the acoustic wave 404. The changes in velocity and amplitude are monitored by measuring the frequency or wave characteristics of an acoustic wave sensor. The acoustic wave system 400 may incorporate a piezoelectric device to generate the acoustic wave 404. The piezoelectric device includes a piezoelectric material that is mechanically stressed by application of an electric field to the piezoelectric material, resulting in the piezoelectric material moving and/or changing shape. The piezoelectric device creates an electric field to create a mechanical wave across the display 16. The mechanical wave propagates across the display 16 and is then evaluated by a controller for measurement and determination of a touch location by a conductive or non-conductive member. In the illustrated embodiment, the acoustic wave system 400 transmits the acoustic wave 404 across the first surface 100 of the EC element 90. It will be understood that the acoustic wave 404 could be transmitted across one or more of the first, second, third, and fourth surfaces 100, 102, 104, 106 of the EC element 90. Contact with a conductive member, such as the finger of a user, absorbs energy from the acoustic wave 404. A controller operably connected with an acoustic wave transmitter can determine the touch coordinates by recognizing a change in the wave frequency at the touch location.

Figure 10:
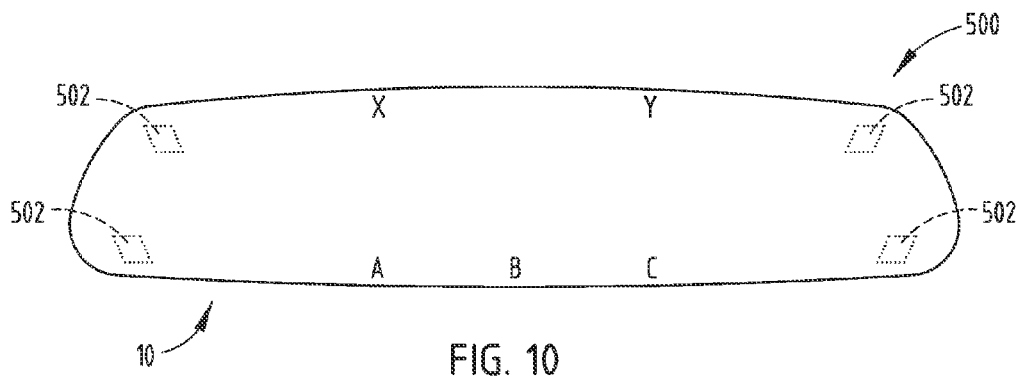
FIG. 10 is a front elevational view of yet another sensing system according to one embodiment of the present invention.

Yet another embodiment of a force or pressure sensing system 500 of the present invention is illustrated in FIG. 10. A force sensing device includes strain sensors 502 that are positioned at each corner of a rigid four-sided piece of glass. The strain sensors 502 may incorporate various types of electronic pressure sensors including piezo resistive strain gauges, capacitive pressure sensors, resonance sensors, thermal conductivity sensors, and electromagnetic sensors. Pressure applied at different positions on the display 16 results in different strain levels recorded by each of the four sensors. The different recorded levels of strain can be used to calculate the location of the pressure applied by a conductive or possibly non-conductive member.

In yet another embodiment of the present invention, resistive technology may be used in the sensing system 20. In this embodiment, the sensing system 20 utilizes a resistive touch screen that includes a transparent flexible membrane layer and a transparent static layer. The transparent flexible membrane layer is a polyester or a similar material, which includes a conductive coating. When pressed using a conductive or non-conductive item, the conductive coating makes resistive contact with the conductive coating on the transparent static layer, which is generally constructed of a rigid polyester, a thin layer of glass, or a similar transparent rigid material. The front and rear substrates 92, 94 are aligned and in close proximity relative to one another, but are only adhered to one another at the periphery of the transparent area. However, small insulators are interspersed between the layers across the display area to control actuation force and prevent the layers from making contact when the display 16 is not receiving pressure by an external member.

The present invention generally includes the ability of a rearview assembly 10 to determine and confirm the touch or contact by a conductive member on a single sensor. The touch is registered by a sensor and the registered touch data is forwarded to a processor on the circuit board 18. Consequently, the processor activates a predetermined function of the rearview assembly 10. Alternatively, if a touch or contact is not confirmed by the sensor, but the switching assembly 22 is actuated, the processor activates a second predetermined function carried out by the rearview assembly 10. The touch coordinates can be determined based on any of the methods described above.

Alternatively, the rearview assembly 10 may include a sensor system with multiple sensors. In this instance, the sensors are designed to determine and confirm a touch or contact made by a conductive member, such as the finger of a user. When the sensor registers a contact made by a conductive member, the sensor forwards the contact information to a processor on the circuit board 18. Based on the sensor that provided the contact information, a particular predetermined function is carried out.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A rearview assembly for a vehicle comprising:
   a housing;
   a carrier operably connected with the housing and supporting a display;
   a circuit board disposed in the housing;
   a sensing system disposed proximate the substrate and connected with the circuit board; and
   a switching assembly operably connected with the circuit board, wherein actuation of the switching assembly when the sensing system has been activated enables a predetermined function of the rearview assembly.

2. The rearview assembly of claim 1, further comprising:
   one of an audible, visual, and tactile feedback indicator operably coupled to the circuit board.

3. The rearview assembly of claim 1, further comprising:
   an overtravel device disposed on the carrier and having a forward stop and a rearward stop.

4. The rearview assembly of claim 1, wherein the circuit board is fixedly attached to the housing.

5. The rearview assembly of claim 1, wherein the switching assembly includes a plurality of switches.

6. The rearview assembly of claim 5, wherein each of the plurality of switches includes a mechanical button.

7. The rearview assembly of claim 1, wherein the carrier is rotatable about one of a mechanical hinge and a living hinge disposed between the carrier and the housing.

8. The rearview assembly of claim 1, wherein the carrier includes multiple compressible supports disposed between the display and the carrier.

9. The rearview assembly of claim 1, wherein the carrier is rotatable about a single axis relative to the housing.

10. The rearview assembly of claim 1, wherein the display forms a portion of an electrochromic element that is operably connected with the carrier.

11. A rearview assembly for a vehicle comprising:
    a housing;
    a carrier operably connected with the housing and supporting a mirror element;
    a circuit board disposed in the housing;
    a sensing system disposed proximate the mirror element and connected with the circuit board, wherein the sensing system is operable between an activated condition and a deactivated condition; and
    a switching assembly operably connected with the circuit board, wherein actuation of the switching assembly when the sensing system has been activated enables a first function of the rearview assembly and actuation of the switching assembly when the sensing system has been deactivated enables a second function of the rearview assembly.

12. The rearview assembly of claim 11, further comprising:
    one of an audible, visual, and tactile feedback indicator operably coupled to the circuit board.

13. The rearview assembly of claim 11, wherein the carrier includes multiple compressible supports disposed between the mirror element and the carrier.

14. The rearview assembly of claim 11, wherein the mirror element forms a portion of an electrochromic element that is operably connected with the carrier.

15. The rearview assembly of claim 11, further comprising:
    a capacitive slider disposed adjacent to the mirror element.

16. The rearview assembly of claim 11, further comprising:
    a glass layer defining a resistive touch screen disposed on the mirror element.

17. A rearview assembly for a vehicle comprising:
    a housing;
    a carrier operably connected with the housing;
    an electrochromic element supported on the carrier and including a first substrate and a second substrate;
    a circuit board disposed in the housing;
    a sensing system including a first contact and a second contact disposed proximate the first substrate of the electrochromic element and operably connected with the circuit board; and
    a switching assembly operably connected with the circuit board, wherein actuation of the switching assembly when the first contact has been activated enables a first function of the rearview assembly and actuation of the switching assembly when the second contact has been activated enables a second function of the rearview assembly.

18. The rearview assembly of claim 17, wherein the carrier is rotatable about one of a mechanical hinge and a living hinge disposed between the carrier and the housing.

19. The rearview assembly of claim 17, wherein the carrier includes multiple compressible supports disposed between the display and the carrier.

20. A rearview assembly for a vehicle comprising:
    a housing;
    a carrier operably connected with the housing;
    an electrically dimmable element supported on the carrier and including a first substrate and a second substrate;
    a circuit board disposed in the housing;
    a switching assembly having a first switch and a second switch that are disposed proximate a periphery of the first substrate and operably connected with the circuit board, wherein the first substrate of the electrochromic element is pivotal about multiple axes relative to the carrier, wherein pivotal rotation of the electrochromic element about a first axis actuates the first switch and pivotal rotation of the electrochromic element about a second axis actuates the second switch.

\* \* \* \* \*